United States Patent [19]

Sawabe et al.

[11] Patent Number: 6,148,138
[45] Date of Patent: Nov. 14, 2000

[54] INFORMATION RECORD MEDIUM, APPARATUS FOR RECORDING THE SAME AND APPARATUS FOR REPRODUCING THE SAME

[75] Inventors: Takao Sawabe, Tokyo-to; Ryuichiro Yoshimura, Tokorozawa; Yoshiaki Moriyama, Tsurugashima; Kaoru Yamamoto, Tsurugashima; Akihiro Tozaki, Tsurugashima; Junichi Yoshio, Tokorozawa, all of Japan

[73] Assignee: Pioneer Electronics Corporation, Tokyo, Japan

[21] Appl. No.: 08/816,686

[22] Filed: Mar. 13, 1997

[30] Foreign Application Priority Data

Mar. 15, 1996 [JP] Japan .................................. 8-059837

[51] Int. Cl.[7] ...................................................... H04N 5/91
[52] U.S. Cl. ................................. 386/69; 386/83; 386/46
[58] Field of Search .................................. 386/69, 83, 46, 386/92, 68, 52, 81, 95, 113, 124, 1, 4, 6, 7, 55; H04N 5/91

[56] References Cited

U.S. PATENT DOCUMENTS

| | | | |
|---|---|---|---|
| 5,568,275 | 10/1996 | Norton et al. | 386/52 |
| 5,646,603 | 7/1997 | Nagata et al. | 386/83 |

FOREIGN PATENT DOCUMENTS

| | | |
|---|---|---|
| 0 460 751 | 12/1991 | European Pat. Off. . |
| 0 460 764 | 12/1991 | European Pat. Off. . |
| 0 651 392 | 5/1995 | European Pat. Off. . |
| 0 696 798 | 2/1996 | European Pat. Off. . |
| 0 724 264 | 7/1996 | European Pat. Off. . |
| 0 730 272 | 9/1996 | European Pat. Off. . |
| 0 752 703 | 1/1997 | European Pat. Off. . |
| 0 847 196 | 6/1998 | European Pat. Off. . |
| 0 847 197 | 6/1998 | European Pat. Off. . |
| 0 847 198 | 6/1998 | European Pat. Off. . |
| 07307914 | 11/1995 | Japan . |
| WO 97 06531 | 2/1997 | WIPO . |

*Primary Examiner*—Robert Chevalier
*Attorney, Agent, or Firm*—Morgan, Lewis & Bockius LLP

[57] ABSTRACT

An information recording apparatus (SS1) is provided with a signal process device (72). The signal process device divides record information (R) into a plurality of partial record information pieces, and applies a predetermined signal process to each of them to output processed partial record information pieces (Sr, P, 42, 43, 44). The signal process device also generates and outputs search reproduction control information (Snav, 41: NAVI-PACK) on the basis of control information (Si) to control a reproduction of the record information inputted from the external. The search reproduction control information includes time information (50: PCI), which indicates a reproduction time for each of the partial record information pieces. The search reproduction control information also includes search information (51: DSI) to search a record position on the information record medium. The apparatus is further provided with a multiplex device (75, 76) for time-axis-multiplexing the processed partial record information pieces and the search reproduction control information.

15 Claims, 16 Drawing Sheets

STRUCTURE OF INTERLEAVED UNIT

IU : INTERLEAVED UNIT

FIG. 5A

```
51
┌─────────────────────────────────┐
│        DSI DATA                 │
├─────────────────────────────────┤
│ ○ GENERAL INFORMATION           │
│                                 │
│ ○ SEAMLESS INFORMATION          │
│                                 │
│ ○ ANGLE JUMP                    │
│   DESTINATION INFORMATION       │
│                                 │
│ ○ VOB UNIT                      │
│   SEARCH INFORMATION            │
│                                 │
│ ○ SYNCHRONOUS                   │
│   REPRODUCTION INFORMATION      │
└─────────────────────────────────┘
```

FIG. 5B

```
50
┌─────────────────────────────────┐
│         PCI DATA                │
├─────────────────────────────────┤
│ ○ GENERAL INFORMATION           │
│                                 │
│ ○ ANGLE JUMP                    │
│   DESTINATION INFORMATION       │
│                                 │
│ ○ HIGH LIGHT  INFORMATION       │
└─────────────────────────────────┘
```

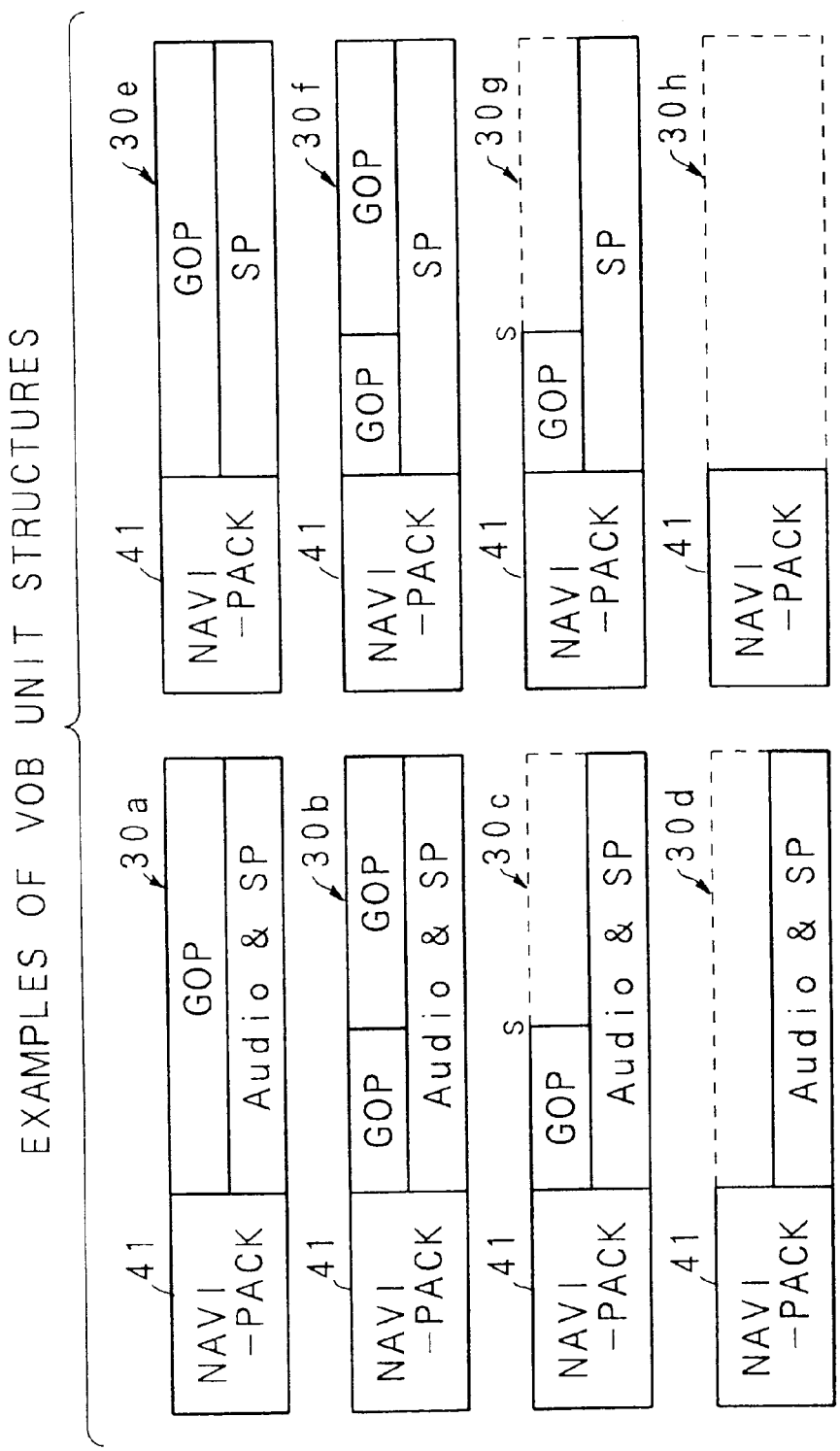

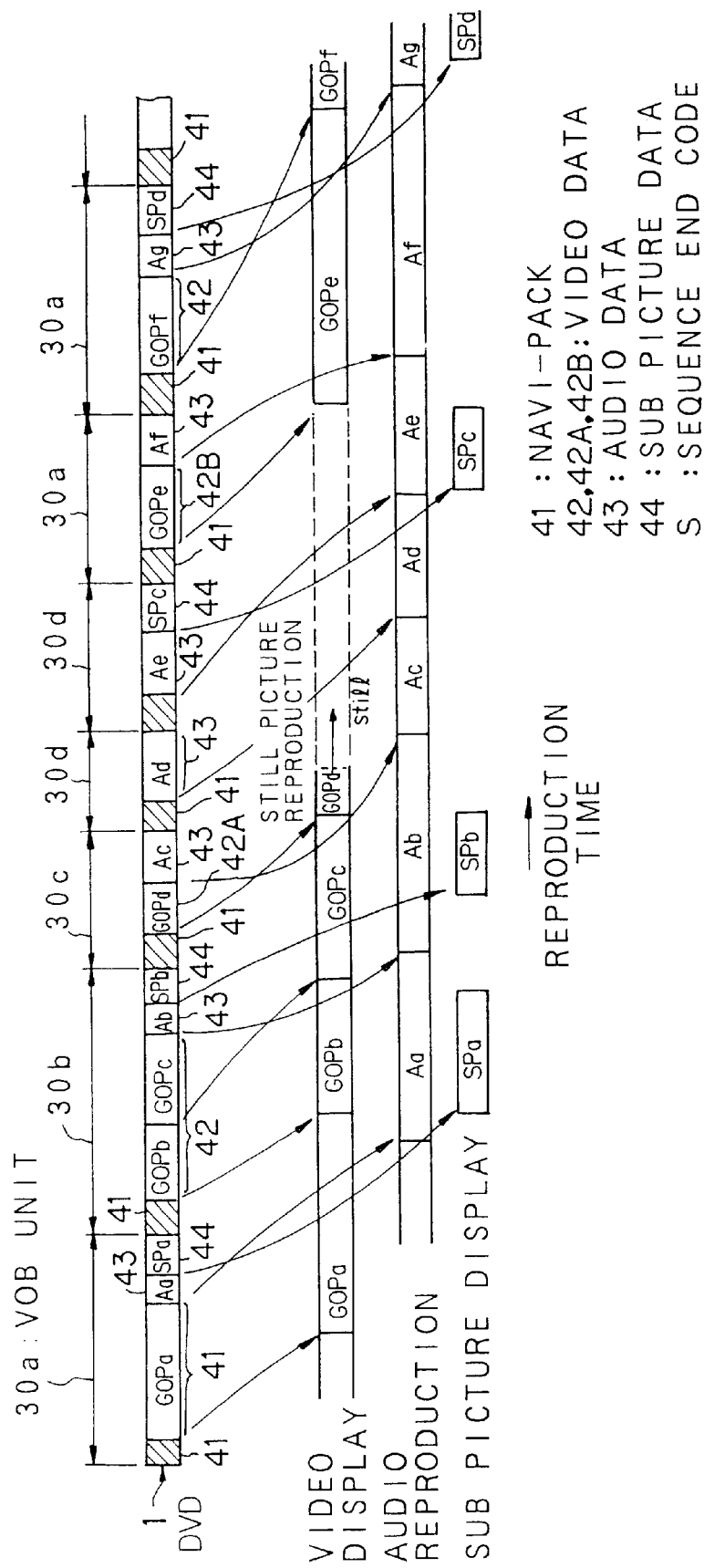

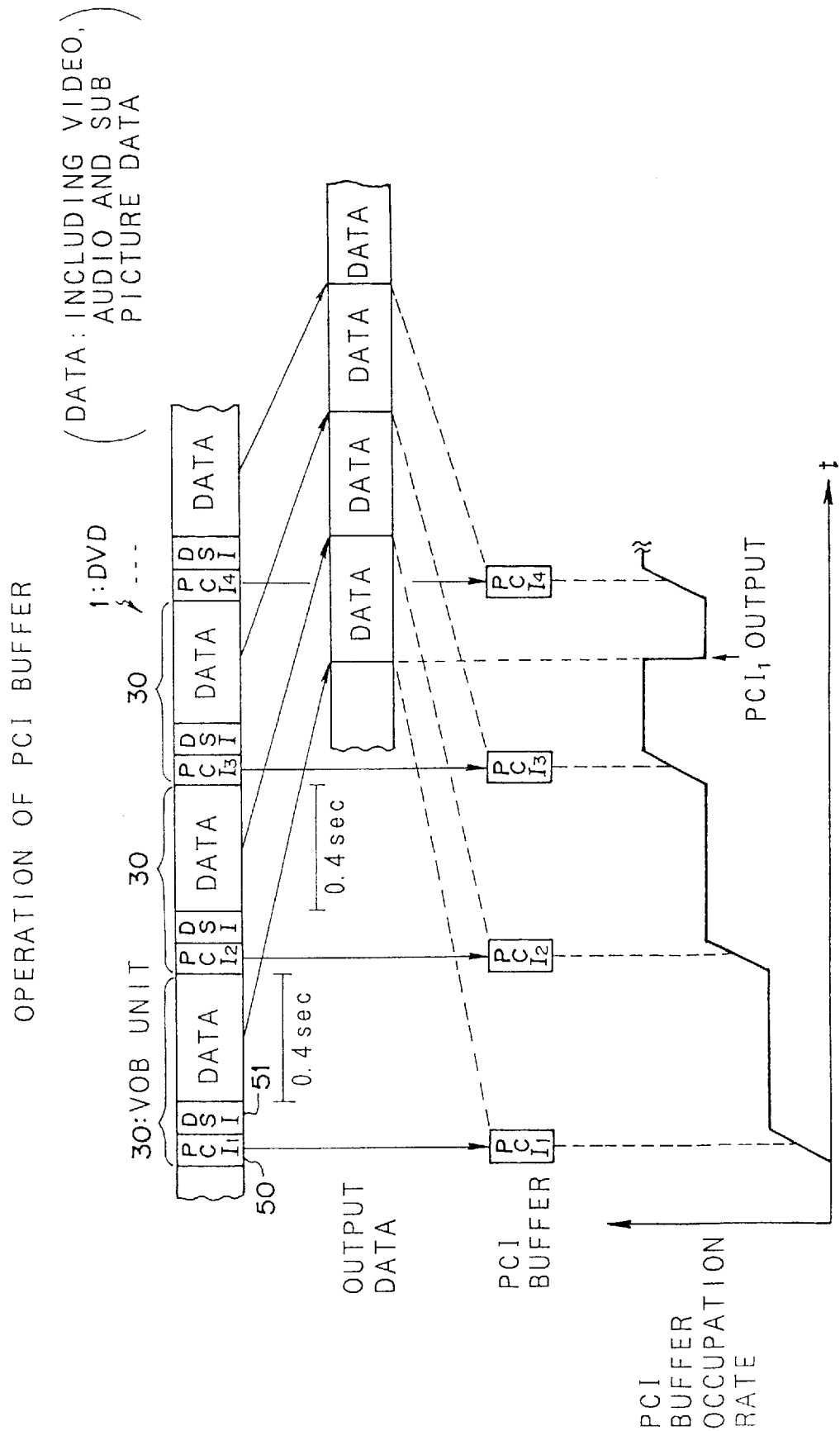

INFORMATION RECORD MEDIUM, APPARATUS FOR RECORDING THE SAME AND APPARATUS FOR REPRODUCING THE SAME

BACKGROUND OF THE INVENTION

1. Field of the Invention

The present invention relates to an information record medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information record medium, and a reproducing apparatus for reproducing the information from the information record medium.

2. Description of the Related Art

Conventionally, a so-called LD (Laser Disk) and a so-called CD (Compact Disk) are generalized as optical disks, on which information such as video information, audio information and the like is recorded.

On the LD or the like, the video information and the audio information are recorded together with time information indicating a time at which each information is to be reproduced with respect to a reproduction start position, which each LD or the like has, as a standard position. Thus, other than a general normal reproduction to reproduce the recorded information in the order of recording, various special reproductions are possible, such as a reproduction to extract and listen to an only desirable music out of a plurality of recorded musics, a reproduction to listen to the recorded musics in a random order and so on, in case of the CD, for example.

However, in the above mentioned LD or the like, for example, there are problems that it is not possible to perform a variegated reproduction, such as a search operation of jumping to a forward portion by a predetermined time, in the course while an audience is reproducing a still picture, to thereby carry out a search action and other flexible operations, and that it is not possible to reproduce while carrying out a time management of displaying an elapsed time from the beginning of the record information during a still picture reproduction according to an author's intention of the record information.

This is because there is no reproduction control information including time information and search information to control the reproduction of the record information between information pieces of the above mentioned record information.

Further, in a conventional LD or the like, at a time of reproducing a still picture of the record information according to the author's intention, there may be a case where it is required to record a plurality of same still picture informations by an amount corresponding to a time duration while the still picture is to be reproduced. In this case, a record area of the record medium cannot be utilized effectively. This results in a certain limitation to the amount of the record information that can be recorded.

On the other hand, various proposals and developments are being made as for the DVD, as an optical disk in which the memory capacity is improved by about ten times without changing the size of the optical disk itself as compared with the aforementioned conventional CD. However, the search operation of jumping to the forward portion by the predetermined time, in the course while the audience is reproducing the still picture, to thereby carry out the search action, or the reproducing operation while carrying out the time management of displaying the elapsed time from the beginning of the record information during the still picture reproduction according to the author's intention of the record information, as mentioned above, is not proposed or developed yet. Further, in the technical art of the DVD, the actuality is such that a person having an ordinary skill in this art does not even recognize the subject itself to enable the search operation in the course of the still picture reproduction and the reproducing operation while carrying out the time management during the still picture reproduction.

SUMMARY OF THE INVENTION

It is therefore an object of the present invention to provide: an information recording apparatus, which can record, onto an information record medium, record information such that a reproduction while accurately performing the time management and a variegated reproduction e.g., a retrieval operation such as a search operation in the course of the still picture reproduction or the like can be performed in accordance with the author's intention, and further, which can record more record information by effectively utilizing the record area of the information record medium; an information record medium on which the record information is recorded by the recording apparatus; and an information reproducing apparatus, which can perform the reproducing operation while accurately performing the above mentioned time management and can perform the variegated reproduction e.g., the retrieval operation, such as the search operation in the course of the still picture reproduction or the like.

The above object of the present invention can be achieved by an information recording apparatus provided with: a signal process device for dividing record information to be recorded onto an information record medium, such as the DVD or the like, into a plurality of partial record information pieces, each corresponding to a predetermined reproduction time interval which is set in advance on an axis of reproduction time, which is a time of reproducing the record information, for applying a predetermined signal process, such as the MPEG 2 method or the like, to each of the partial record information pieces to output processed partial record information pieces, and for generating and outputting search reproduction control information, such as a navi-pack (navigation-pack described later) or the like, including time information, such as PCI (Presentation Control Information) or the like, which indicates a reproduction time when each of the partial record information pieces is to be reproduced on the axis of reproduction time, for each of the partial record information pieces, and also including search information, such as DSI (Data Search Information) or the like, to search a record position on the information record medium of each of the partial record information pieces to be reproduced, on the basis of control information to control a reproduction of the record information inputted from the external; a multiplex device, such as a controller, a multiplexer or the like, for time-axis-multiplexing the processed partial record information pieces and the search reproduction control information while inserting the search reproduction control information to corresponding each of the processed partial record information pieces, to output multiplexed partial record information, such as a VOBU (Video OBject Unit) or the like; and a record device, such as a mastering device or the like, for recording the multiplexed partial record information onto the information record medium.

According to the information recording apparatus of the present invention, on one hand, the record information is divided into a plurality of partial record information pieces each corresponding to the predetermined reproduction time interval, and the predetermined signal process is applied to each of the partial record information pieces, so that the processed partial record information pieces is outputted, by the signal process device. On the other hand, the search reproduction control information is also generated and outputted on the basis of the control information to control a reproduction of the record information inputted from the external, by the signal process device. Here, the search reproduction control information includes the time information, which indicates a reproduction time when each of the partial record information pieces is to be reproduced on the axis of reproduction time, and also includes the search information to search a record position on the information record medium of each of the partial record information pieces to be reproduced. Then, the processed partial record information pieces and the search reproduction control information are time-axis-multiplexed while inserting the search reproduction control information to corresponding each of the processed partial record information pieces, so that the multiplexed partial record information is outputted, by the multiplex device. Finally, the multiplexed partial record information is recorded onto the information record medium, by the record device.

Thus, at the time of reproducing the record information, since the search reproduction control information, which includes the time information, is detected for each of the partial record information pieces i.e., per the predetermined reproduction time interval, the record information can be reproduced while precisely performing the time management even if the partial record information piece does not include the video information but only the still picture information.

Further, since the search reproduction control information also includes the search information to search the record position of each of the partial record information pieces, at the time of reproducing the record information, the reproduction can be performed by speedily searching the record position of each of the partial record information pieces to be precisely reproduced.

Therefore, it is possible to perform the precise and variegated reproduction of the record information, including the still picture reproduction, on the basis of the author's intention, and it is also possible to display a reproduction elapse time from the beginning or head of the record information even during the still picture reproduction.

Further, on the basis of the search information, it is possible to search the record information corresponding to the reproduction time, which is a desired time period after the present, while reproducing the still picture, so that it is possible to perform the variegated reproduction based on the search information in line with the author's intention.

In one aspect of the information recording apparatus of the present invention, the record information includes video information containing at least still picture information to be still-picture -reproduced, sub-picture information to be superimposed on the video information and be displayed, and audio information corresponding to the video information and the sub-picture information. The signal process device generates the search reproduction control information such that the time information corresponding to each of the partial record information pieces containing the still picture information comprises the time information indicating the reproduction time when a still picture based non the still picture information is to be reproduced. And that the multiplex device time-axis-multiplexes such that, in case that the reproduction time when the still picture information is to be reproduced is included in the predetermined reproduction time interval, the multiplexed partial record information corresponding to the reproduction time consists of at least one of the sub-picture information and the audio information and does not consist of the video information.

According to this aspect, at the time of reproducing the record information, it is possible to perform the still picture reproduction precisely by use of the time information included in the search reproduction control information, even in a case where only the sub-picture information or audio information corresponding to the still picture is reproduced while the still picture reproduction is performed, At the same time, since it is not required to record the frame pictures corresponding to the time interval during which the still picture reproduction is performed, the record area on the information record medium can be effectively utilized without uselessness.

In another aspect of the information recording apparatus of the present invention, the record information includes video information containing at least still picture information to be still-picture-reproduced. The signal process device generates the search reproduction control information such that the time information corresponding to the partial record information pieces containing the still picture information includes the time information when a still picture based on the still picture information is to be reproduced. And that the multiplex device time-axis-multiplexes such that, in case that the reproduction time when the still picture information is to be reproduced is included in the predetermined reproduction time interval, the multiplexed partial record information corresponding to the reproduction time consists of only the search reproduction control information.

According to this aspect, at the time of performing the still picture reproduction, it is possible to perform the still picture reproduction precisely by use of the time information included in the search reproduction control information. At the same time, since it is not required to record the frame pictures corresponding to the time interval during which the still picture reproduction is performed, the record area on the information record medium can be effectively utilized without uselessness.

The above object of the present invention can be also achieved by an information record medium such as the DVD or the like, on which record information to be reproduced by an information reproducing apparatus for reproducing the record information on the basis of search reproduction control information recorded with the record information. The information record medium comprises a data structure stored in the information record medium and including: processed partial record information pieces generated by dividing the record information into a plurality of partial record information pieces, each corresponding to a predetermined reproduction time interval which is set in advance on an axis of reproduction time, which is a time of reproducing the record information, and by applying a predetermined signal process, such as the MPEG 2 method or the like, to each of the partial record information pieces; and the search reproduction control information such as the navi-pack or the like, including time information such as the PCI or the like, which indicates a reproduction time when each of the partial record information pieces is to be reproduced on the axis of reproduction time, for each of the partial record information pieces, and also including search information such as the DSI or the like to search a record position on the information record medium of each of the partial record information pieces to be reproduced. And that, the data structure has such a time-axis-multiplexed structure that multiplexed partial record information such as the VOBU or the like is formed by inserting the search reproduction control information to corresponding each of the processed partial record information pieces.

According to the information record medium of the present invention, the processed partial record information pieces, which is generated by dividing the record information into a plurality of partial record information pieces and by applying the predetermined signal process to each of them, and the search reproduction control information, which includes the time information and the search information, are time-axis-multiplexed by inserting the search reproduction control information to corresponding each of the processed partial record information pieces.

Therefore, the advantageous effect of the above described information recording apparatus of the present invention can be obtained in the same manner.

In one aspect of the information record medium of the present invention, the record information includes video information containing at least still picture information to be still-picture-reproduced, sub-picture information to be superimposed on the video information and be displayed, and audio information corresponding to the video information and the sub-picture information. The time information corresponding to each of the partial record information pieces containing the still picture information comprises the time information indicating the reproduction time when a still picture based on the still picture information is to be reproduced. And that, in case that the reproduction time when the still picture information is to be reproduced is included in the predetermined reproduction time interval, the multiplexed partial record information corresponding to the reproduction time consists of at least one of the sub-picture information and the audio information and does not consist of the video information.

Therefore, the advantageous effect of the above described one aspect of the information recording apparatus of the present invention can be obtained in the same manner.

In another aspect of the information record medium of the present invention, the record information includes video information containing at least still picture information to be still-picture-reproduced. The time information corresponding to the partial record information pieces containing the still picture information includes the time information when a still picture based on the still picture information is to be reproduced. And that, in case that the reproduction time when the still picture information is to be reproduced is included in the predetermined reproduction time interval, the multiplexed partial record information corresponding to the reproduction time consists of only the search reproduction control information.

Therefore, the advantageous effect of the above described another aspect of the information recording apparatus of the present invention can be obtained in the same manner.

The above object of the present invention can be also achieved by an information reproducing apparatus for reproducing record information recorded on the above described information record medium of the present invention. The information reproducing apparatus is provided with: a detection and demodulation device, such as an optical pickup, a decode and correct unit or the like, for detecting and demodulating the multiplexed partial record information from the information record medium on the basis of a control signal, and outputting a demodulation signal; an extract device, such as a system buffer, a demultiplexer or the like, for extracting the search reproduction control information per the predetermined reproduction time interval, from the demodulation signal outputted from the detection and demodulation device; and a controller, such as a system controller or the like, for outputting the control signal and controlling the reproduction of the record information on the basis of the extracted search reproduction control information.

According to the information reproducing apparatus of the present invention, the multiplexed partial record information is detected and demodulated from the information record medium, by the detection and demodulation device, on the basis of the control signal, so that the demodulation signal is outputted therefrom. Then, the search reproduction control information is extracted per the predetermined reproduction time interval, from the demodulation signal, by the extract device. Then, the control signal is outputted and the reproduction of the record information is controlled on the basis of the extracted search reproduction control information, by the controller.

Thus, since the search reproduction control information, which includes the time information, is detected per the predetermined reproduction time interval, the record information can be reproduced while precisely performing the time management even if the partial record information piece does not include the video information but only the still picture information.

Further, since the search reproduction control information also includes the search information, the reproduction can be performed by speedily searching the record position of each of the partial record information pieces to be precisely reproduced, in the same manner as the above described information recording apparatus of the present invention.

In one aspect of the information reproducing apparatus of the present invention, the record information includes video information containing at least still picture information to be still-picture-reproduced, sub-picture information to be superimposed on the video information and be displayed, and audio information corresponding to the video information and the sub-picture information. The time information corresponding to each of the partial record information pieces containing the still picture information comprises the time information indicating the reproduction time when a still picture based on the still picture information is to be reproduced. And that, the detection and demodulation device detects, in case that the reproduction time when the still picture information is to be reproduced is included in the predetermined reproduction time interval, the multiplexed partial record information consisting of at least one of the sub-picture information and the audio information and not consisting of the video information, at the reproduction time.

According to this aspect, it is possible to perform the still picture reproduction precisely by use of the time information included in the search reproduction control information, even in a case where only the sub-picture information or audio information corresponding to the still picture is reproduced. At this time, since useless still picture information is not included in the demodulation signal, the reproduction process of the sub picture information or audio information can be performed speedily in parallel with the still picture reproduction.

In another aspect of the information reproducing apparatus of the present invention, the record information includes video information containing at least still picture information to be still-picture-reproduced. The time information corresponding to the partial record information pieces containing the still picture information includes the time information when a still picture based on the still picture information is to be reproduced. And that, the detection and demodulation device detects, in case that the reproduction time when the still picture information is to be reproduced is included in the predetermined reproduction time interval, the multiplexed partial record information consisting of only the search reproduction control information at the reproduction time.

According to this aspect, it is possible to perform the still picture reproduction precisely by use of the time information included in the search reproduction control information. At this time, since useless still picture information is not included in the demodulation signal, the reproduction process of the sub picture information or audio information can be performed speedily in parallel with the still picture reproduction.

The nature, utility, and further features of this invention will be more clearly apparent from the following detailed description with respect to preferred embodiments of the invention when read in conjunction with the accompanying drawings briefly described below

BRIEF DESCRIPTION OF THE DRAWINGS

FIG. 5A is a diagram showing various information included in a DSI data in the embodiment;

FIG. 5B is a diagram showing various information included in a PCI data in the embodiment;

FIG. 7 is a diagram showing examples of VOB unit structures;

FIG. 9 is a diagram showing the relationship between each data constructing VOB unit and the reproduction time thereof;

FIG. 16 is a diagram showing an operation of a PCI buffer of the embodiment in FIG. 11.

DETAILED DESCRIPTION OF THE PREFERRED EMBODIMENTS

Referring to the accompanying drawings, embodiments of the present invention will be now explained. The following explanations will be done for the embodiments, in which the present invention is applied to the aforementioned DVD.

In the following embodiments, constitutional elements listed on a right hand side in a following list respectively construct examples of constitutional elements of the present invention listed on a left hand side in the following list.

partial record information: substantial data portion such as video data etc. before the signal process to construct the VOB unit processed partial record information: substantial data portion of the VOB unit other than the navi-pack, such as video data etc.

multiplexed partial record information: VOB unit time information: PCI (Presentation Control Information) data search information: DSI (Data Search Information) data search reproduction control information: navi-pack video information: video data sub picture information: sub picture data audio information: audio data (I) Embodiment of Information Record Medium First of all, a physical structure and a logical structure as well as an operation of a DVD, as one embodiment of the information record medium to which the present invention is applied, will be explained with reference to FIGS. 1 to 8.

Figure 1:
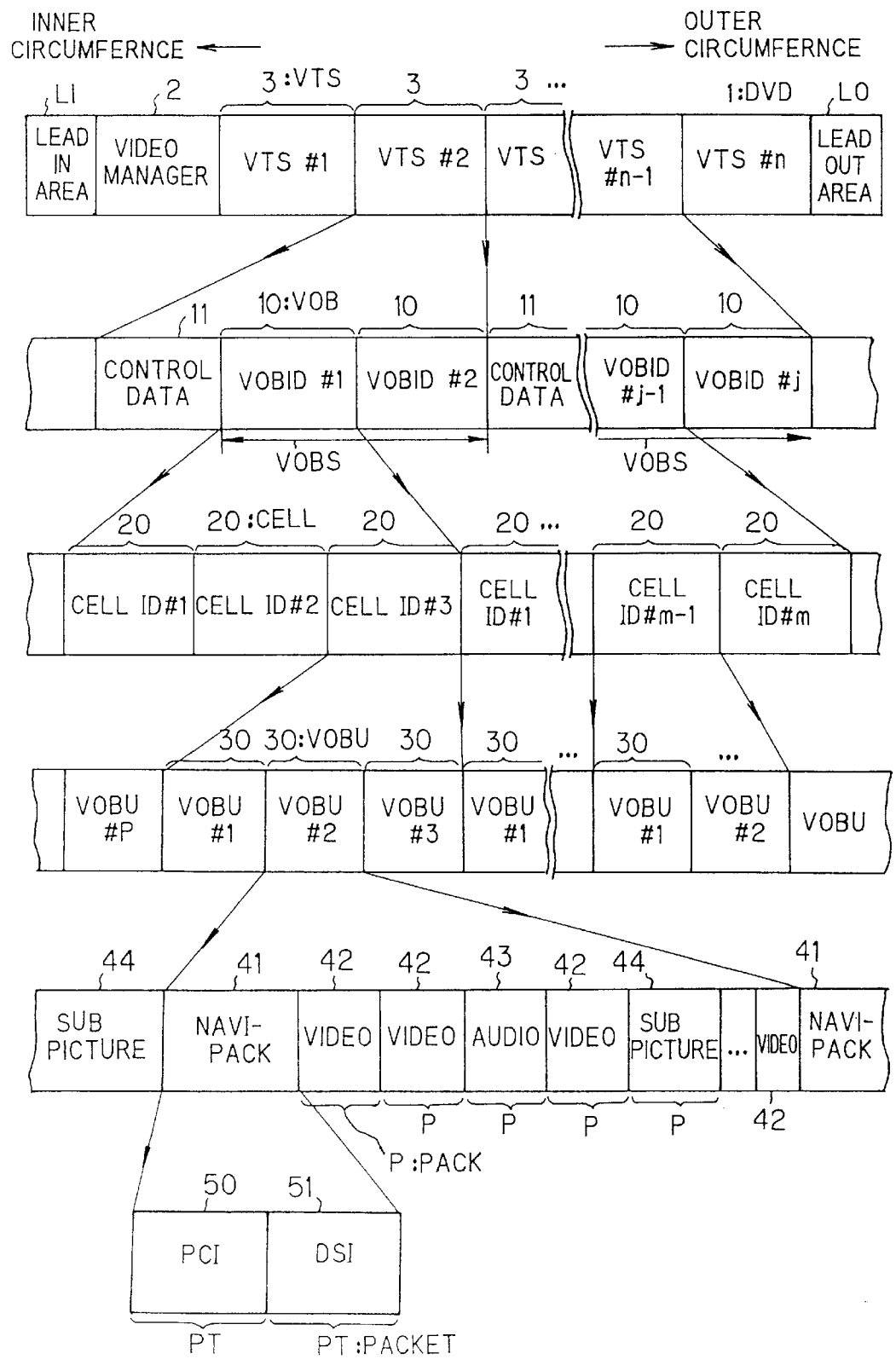
FIG. 1 is a diagram showing a physical structure of record information of a DVD as one embodiment of the present invention.

At first, a record format of video information and audio information on the DVD (i.e. a physical record format) is explained by use of FIG. 1.

As shown in FIG. 1, a DVD 1 as the present embodiment is provided with a lead in area LI at its most inner circumferential portion and a lead out area LO at its most outer circumferential portion, between which video information and audio information are recorded such that they are divided into a plurality of VTSs 3, each of which has a unique ID (Identification) number (i.e. VTS#1 to VTS#n). Here, the VTS (Video Title Set) 3 is a set (bundle) of titles (each of which is one production or one work which an author or producer intends to offer to the audience), which are related to each other (e.g., which attribute, such as the number, the specification, the corresponding languages etc. of the audio information and sub picture information included therein, is the same to each other). More concretely, a plurality of movies which are related to the same movie to each other but which languages of serifs (lines) are different from each other may be recorded as different titles respectively, or even in case of the same movies, the theater version and the special version may be recorded as different titles respectively. Ahead of the area where the VTSs 3 are recorded, a video manager 2 is recorded as shown in FIG. 1. As the information recorded in the video manager 2, for example, information related to the whole video and audio information recorded on the DVD 1, such as a menu for showing a name of each title, information for preventing an illegal copy, an access table for accessing each title and so on, is recorded.

One VTS 3 is recorded such that it is divided into a plurality of VOBs 10, each of which has an ID number (VOB ID#1, VOB ID#2, . . . ), and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1, cell ID#2, . . . ). Here, one VOB 10 is constructed such that it is completed by the plurality of cells 20 and that one cell 20 does not strides over two VOBs 10.

Nextly, one cell 20 is constructed of a plurality of VOB units (VOBUs) 30, each of which has an ID number (VOBU#1, VOBU#2, . . . ). Here, the VOB unit 30 is an information unit, each of which includes the video information, the audio information and sub picture information (which is defined as information of a sub picture such as a subtitle of a movie etc.).

One VOB unit 30 is provided with: a navi-pack (a navigation pack) 41, in which control information for controlling video data etc. included in the VOB unit 30; a video data 42 as the video information; an audio data 43 as the audio information; and a sub picture data 44 as the sub picture information. Here, in a pack P for the video data 42, only the video data is recorded. In a pack P for the audio data 43, only the audio data is recorded. Further, in a pack P for the sub picture data 44, only graphic data of a character, a diagram or the like as the sub picture, is recorded. In the video packs 42, which data amount is relatively large as shown in FIG. 1, one or a plurality of GOPs are recorded within one VOB unit 30. The audio data 43 and the sub picture data 44 are disposed intermittently between the video packs 42. It is prescribed by a standard specification of the DVD that there are 8 kinds of audio recordable on the DVD 1 while 32 kinds of sub picture recordable on the DVD 1.

These data are recorded such that the reproduction time corresponding to one VOB unit 30 (i.e. the reproduction time corresponding to the data recorded between one navi-pack 41 and another navi-pack 41 adjacent to said one navi-pack 41) is not shorter than 0.4 seconds and not longer than 1 second. Here, the reason why the reproduction time corresponding to one VOB unit 30 is not shorter than 0.4 seconds is to reduce a memory capacity of a PCI buffer in a reproducing apparatus described later, and the reason why it is not longer than 1 second is that the tolerable delay time period for a decoding process of the video data 42 is 1 second which is prescribed by the standard of the MPEG 2 method. Therefore, the navi-pack 41 is always detected once every 0.4 seconds to 1 second, at the time of reproduction.

Further, there always exists the navi-pack 41 in one VOBU 30 at the head thereof. On the other hand, there may not exist each of the video data 42, the audio data 43 and the sub picture data 44 in one VOBU 30, or, even in case that the packs P for these data exist in one VOBU 30, the number of the packs P and the order of the packs P are freely determined.

Here, a division of each of the video data 42, the audio data 43 and the sub picture data 44 is called as a pack P. Namely, in one VOB unit 30, the video data 42, the audio data 43 and the sub picture data 44 are divided into packs P respectively and recorded, wherein the pack P in which the video data 42 is recorded is called as a video pack, the pack P in which the audio data 43 is recorded is called as an audio pack, and the pack P in which the sub picture data 44 is recorded is called as a sub picture pack, Further, a reading start time information, which is called as a SCR (System Clock Reference), is recorded at a pack header recorded at the head of each pack P. This SCR indicates a reading start time on a time axis of reproduction time, at which reading the data included in each pack P from the track buffer in the reproducing apparatus described later and inputting the read data into each buffer is to be started. On the other hand, as for each pack P, the video data 42, the audio data 43 or the sub picture data 44 is recorded in each packet, which is generally a record unit obtained by dividing the pack P more finely. In the DVD 1 of the present embodiment, one pack P consists of one packet PT in general.

Finally, the navi-pack 41 is provided with: a DSI (Data Search Information) data 51 in a packet PT including search information to search a video image or an audio sound desired to be displayed or sound-outputted (concretely, search information such as an address, where the video or audio to be displayed or sound-outputted is recorded, on the DVD 1); and a PCI (Presentation Control Information) data 50 in a packet PT including information related to a display control at a time of displaying the video image or outputting the audio sound, which is searched on the basis of the information of the DSI data 51. At this time, the DSI data 51 and the PCI data 50 construct the DSI packet and the PCI packet respectively as the packets PTs and are recorded. Further, all video data 42 included in one VOBU 30 consist of at least one GOP (Group Of Pictures) each having an ID number.

In the PCI data 50, high light information, which defines a display or operation at a time when one selection item is selected out of selection items by the audience, is included. By the high light information, for example, the change of the picture plane display for a selection item as well as the display position to be changed in correspondence with the selection item, on a special picture plane of selection items (i.e. a so-called menu picture plane) for the audience to select, and the command corresponding to the selected item (i.e. a command to be performed in correspondence with the selected item) are set.

Further, the video information to construct and display a frame, a selection button and the like, which is required to construct and display the menu picture plane, is recorded in the sub picture data 44 as the sub picture information.

On the other hand, the above described GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment. At the head of each GOP, reproduction display time information, which is called as PTS (Presentation Time Stamp) indicating a reproduction time on the axis of reproduction time, at which the video data 42 included in the pertinent GOP is to be displayed.

Here, the outline of the MPEG 2 method is explained. Namely, in general, frame pictures forward and backward of one frame picture in continuous frame pictures are often resembled to each other and have mutual relationships. The MPEG 2 method is a method, which is proposed by paying an attention to this fact, and which generates one frame picture existing between a plurality of frame pictures on the basis of the plurality of frame pictures transferred while they are timely separated by a few or several frames from each other, by means of an interpolating calculation based on moving vectors etc. of the original picture. In this case, if this one frame picture is to be recorded, it is enough to just record the information as for a differential vector and a moving vector thereof with respect to the plurality of frame pictures, so as to reproduce this one frame picture by estimating it from the plurality of frame pictures with referring to these vectors, at a time of reproduction. By this, the compression recording is enabled with respect to the picture.

Figure 2:
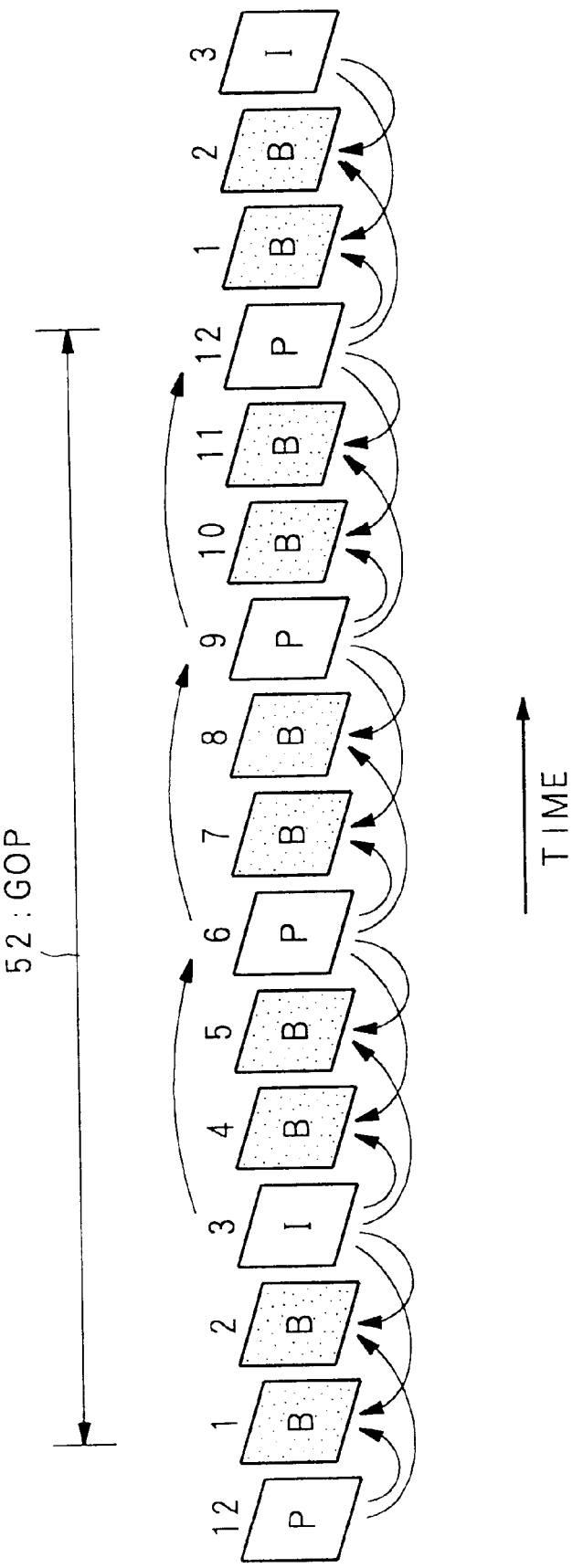
FIG. 2 is a diagram showing frame pictures constructing a GOP.

Further, the scheme of the above explained GOP is explained with reference to FIG. 2. FIG. 2 shows an example of a plurality of frame pictures constituting one GOP. In FIG. 2, a case where one GOP 52 consists of 12 frame pictures is illustrated (in the MPEG 2 method, the number of the frame pictures included in one GOP 52 is not fixed), for example. Among those frame pictures, a frame picture indicated by a reference sign "I" is called as an I picture (Intra-coded picture), which is defined as a frame picture able to be reproduced as a complete frame picture by use of its own picture information. A frame picture indicated by a reference sign "P" is called as a P picture (Predictive-coded picture), which is defined as a frame picture predicted or generated by decoding a difference from a predictive picture compensated and reproduced on the basis of the already decoded I picture or other picture. A frame picture indicated by a reference sign "B" is called as a B picture (Bidirectionally Predictive-coded picture), which is defined as a frame picture predicted or reproduced by use of not only the already decoded I picture or P picture but also the I picture or P picture which is recorded on the optical disk timely in the future relative to the pertinent B picture. In FIG. 2, the relationship in the prediction (i.e. the relationship in the compensation) between the respective pictures are indicated by arrows.

The MPEG 2 method used in the DVD 1 of the present embodiment employs a variable rate method, in which the data amount included in each GOP is not constant. Namely, in case that the respective pictures included in one GOP 52 correspond to a moving picture, which moving speed is rather fast and that the mutual relationship between the respective pictures is relatively small, the data amount constituting the respective pictures is increased, so that the data amount included in one GOP 52 is also increased. On the other hand, in case that the respective pictures included in one GOP 52 correspond to a moving picture which moving speed is rather slow and that the mutual relationship between the respective pictures is relatively large, the data amount constituting the respective pictures is decreased, so that the data amount included in one GOP 52 is also decreased.

In the above explained record format having a hierarchical structure as shown in FIG. 1, each division can be freely set according to the author's intention, so as to perform recording on the basis of these set divisions. By performing the reproduction on the basis of a later described logical structure for each of these divisions, the variegated reproduction can be performed.

Nextly, a logical format (logical structure) constructed by combining the information recorded by the physical divisions shown in FIG. 1 is explained with reference to FIG. 3. The information is not actually recorded on the DVD 1 in the logical structure of FIG. 3. Instead, information (e.g. access information or time information) to reproduce each data shown in FIG. 1 by combining them -(especially combining the cells 20) in the logical structure shown in FIG. 3, is recorded on the DVD 1, especially in the control data 11.

Figure 3:
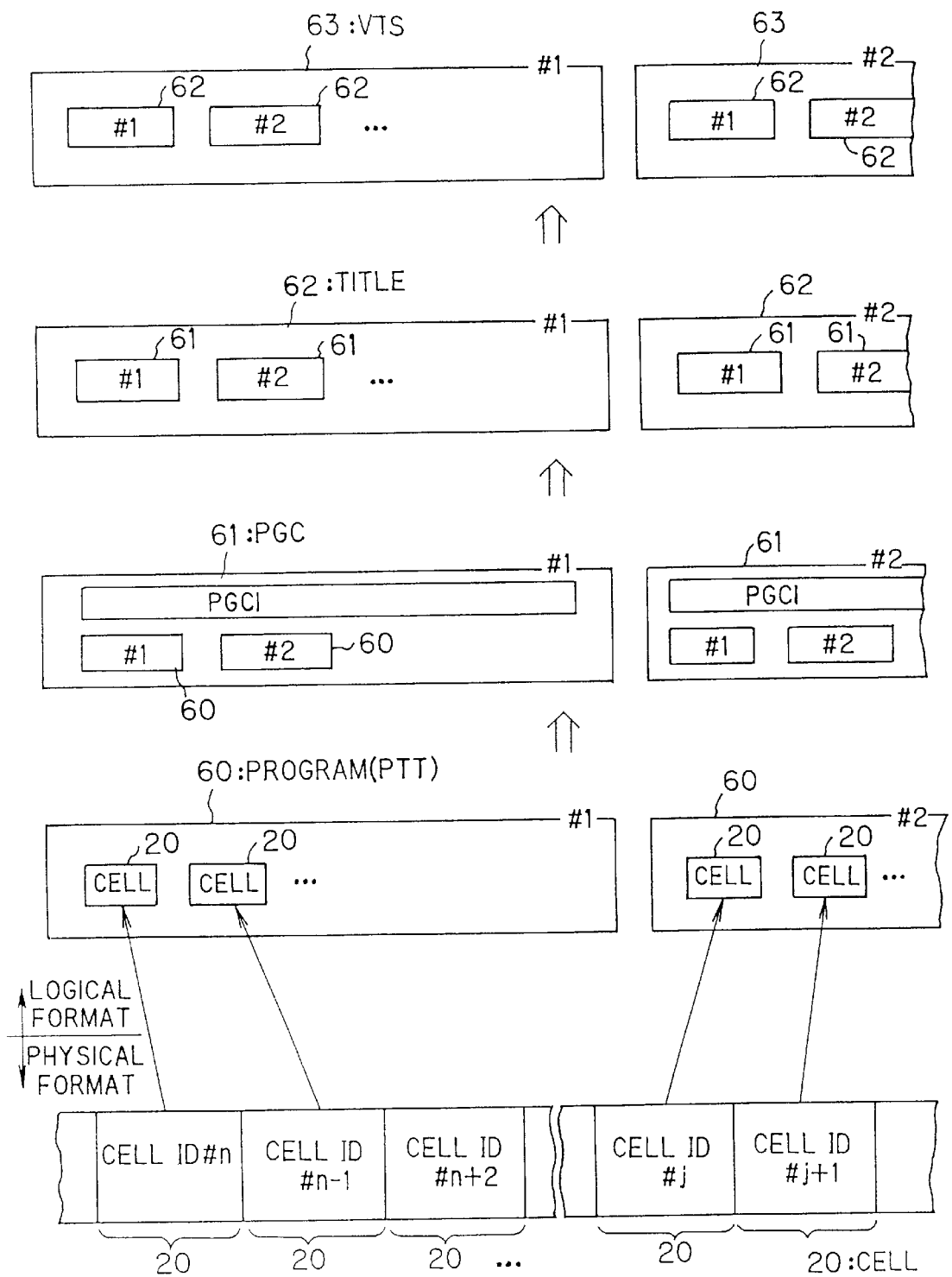
FIG. 3 is a diagram showing a logical structure of the record information of the DVD in FIG. 1.

To make the explanation clear, the following explanation is made from the lower hierarchical layer in FIG. 3. One program 60 is logically constructed on the basis of the author's intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (ParT of Title).

Since one program 60 is logically constructed by selecting a plurality of cells 20, it is possible to use one cell commonly for a plurality of programs 60, namely to perform a so-called "alternative usage" of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 3, the number is treated as the cell number in the order of description in the PGCI described later.

Next, by combining a plurality of programs 60, one PGC (Program Chain) 61 is logically constructed on the basis of the author's intention. The aforementioned PGCI (ProGram Chain Information) is defined by a unit of the PGC 61. The PGCI includes information indicating: the reproduction order for each program 60 at a time of reproducing each program 60 (by this reproduction order, a unique program number (#1, #2, . . . ) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60 [it is possible for the author to select one reproduction method out of (i) a random reproduction (which is a random reproduction by use of random numbers, and the same program 60 may be reproduced by a plurality of times), (ii) a shuffle reproduction (which is a random reproduction by use of random numbers in the same manner as the random reproduction, but one program 60 is reproduced just once but not reproduced by a plurality of times), (iii) a loop reproduction (which is a reproduction to reproduce one PGC 61 repeatedly), and (iv) a combination of the loop reproduction with the random reproduction or the shuffle reproduction, as a reproduction method to be employed at a time of reproduction]; and various commands (e.g. commands able to be specified by the author for each PGC 61 or each cell 20). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Then, one title 62 is logically constructed of one or a plurality of PGCs 61 (PGC #1, PGC#2, . . . ) as shown in FIG. 3. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ) as shown in FIG. 3. The title 62 included in the VTS 63 has the attributes common to each other. For example, the movies based on one movie but in different languages correspond to the respective titles 62. The information included in one VTS 63 shown in FIG. 3 corresponds to information included in one VTS 3 shown in FIG. 1. Namely, all information included in the logical VTS 63 shown in FIG. 3 is recorded as one VTS 3 in the DVD 1 shown in FIG. 1.

As the author specifies the information divided in the physical structure on the DVD 1 on the basis of the above described logical format, the video image (e.g. the movie image) for the audience to watch is to be formed.

In the explanations for the physical structure shown in FIG. 1, for the easy understanding of the content, it has been explained such that a plurality of cells 20 are recorded in the order of the ID numbers. However, in the DVD 1 of the present embodiment, one cell 20 may be divided into a plurality of interleaved units IU to be actually recorded on the DVD 1, as shown in FIG. 4.

Figure 4:
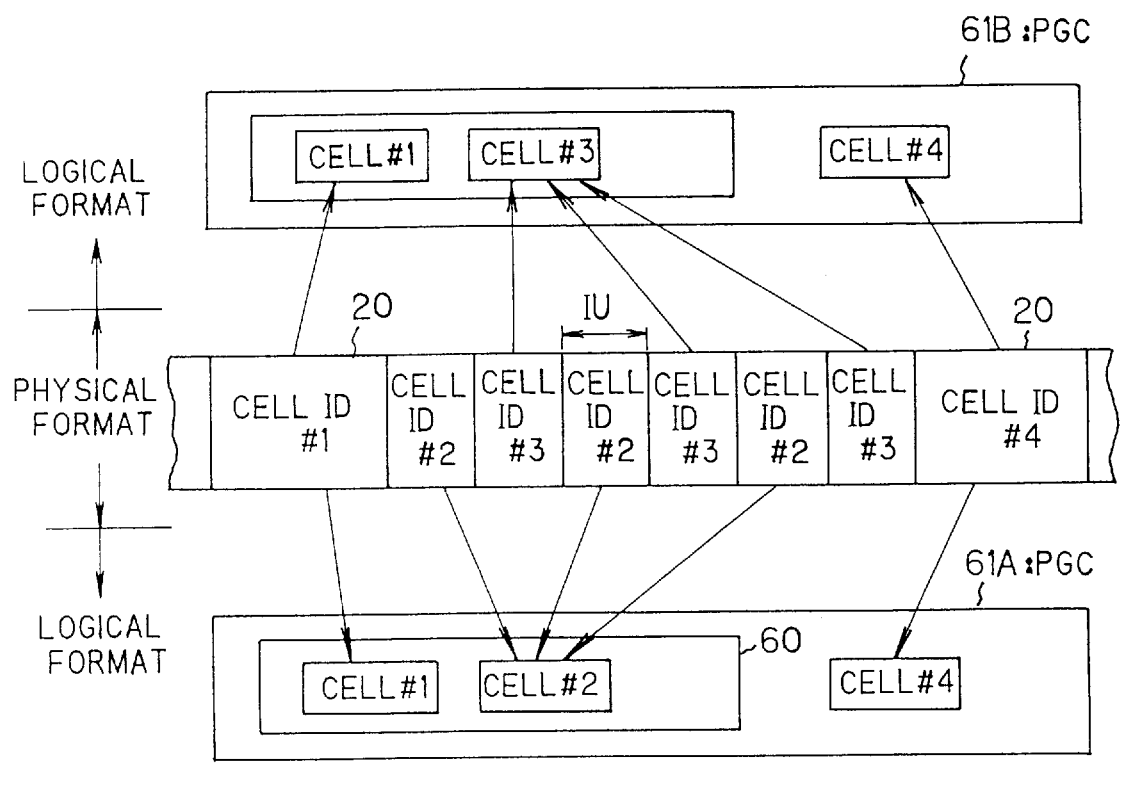
FIG. 4 is a diagram showing a structure of an interleaved unit of the DVD in FIG. 1.

Namely, as shown in FIG. 4, it is assumed that the author constructs one PGC 61A of the cells 20 having the ID numbers 1, 2 and 4, and constructs another PGC 61B of the cells 20 having the ID numbers 1, 3 and 4. In this case, at a time of reproducing the information from the DVD 1 on the basis of the PGC 61A, only the cells having the ID numbers 1, 2 and 4 are reproduced, while, at a time of reproducing the information from the DVD 1 on the basis of the PGC 61B, only the cells 20 having the ID numbers 1, 3 and 4 are reproduced. In the case of the PGC 61A for example, if the cells 20 are recorded spaced from each other for each ID number, a certain time period to jump the optical pickup from the record position of the cell 20 having the ID number 2 on the DVD 1 to the record position of the cell 20 having the ID number 4 on the DVD 1 is required in the reproduction. This results in that the continuous reproduction (hereinafter, it is referred to as a "seamless reproduction") of the cell 20 having the ID number 2 and the cell 20 having the ID number 4 may not be possible depending on a capacity of a track buffer of the reproducing apparatus described later.

Therefore, in the case shown in FIG. 4, the cell 20 having the ID number 2 and the cell having the ID number 3 are divided into interleaved units IU and are recorded by the interleaved units IU, each having a length, which does not destroy the continuity of an output signal of the track buffer even if an input signal to the track buffer is temporarily stopped, in correspondence with an input and output processing speeds at a track buffer of the reproducing apparatus described later (i.e. the interleaved units IU, each having a length which allows the track buffer to continuously output the output signal even if the input signal to the track buffer is ceased while the optical pickup jumps for the interval of one interleaved unit IU). For example, in case of reproduction based on the PGC 61A, only the interleaved units IU constructing the cell 20 corresponding to the ID number 2 are continuously detected to be reproduced. In the same manner, in case of reproduction based on the PGC 61B, only the interleaved units IU constructing the cell 20 corresponding to the ID number 3 are continuously detected to be reproduced. The length of the interleaved unit IU may be determined with considering the capability of a driving mechanism such as a slider motor to perform the track jump, in addition to the memory capacity of the track buffer.

In this manner, by dividing one cell 20 into a plurality of interleaved units IU and recording them according to the author's intention, the signal outputted from the track buffer can be continuous even at a time of reproducing the PGC 61 including the cells 20 having the discontinuous ID numbers, so that it is possible for the audience to watch continuous reproduction video image.

Each interleaved unit IU is completed in one VOB 10, and does not stride over two adjacent VOBs 10. As for the relationship between the interleaved unit IU and the VOB unit 30, one or a plurality of VOB units 30 are included in one interleaved unit IU. One VOB unit 30 is completed in one interleaved unit IU, and is not divided into a plurality of interleaved units IU or does not strides over a plurality of interleaved units IU.

Since it is necessary to record the information at various hierarchy classes explained above, the record information having the above explained recording format is suitable for an information record medium having a large memory capacity, such as the aforementioned DVD 1, which memory capacity is so large that audio sounds or subtitles in various kinds of languages in addition to the movie itself can be recorded on a single optical disk as for the audio voice or subtitle of the movie.

Nextly, among the video information and the audio information having the above mentioned physical structure and logical structure, the PCI data 50 and the DSI data 51 especially related to the present invention are explained with reference to FIGS. 5A and 5B.

At first, in the DSI data 51, the search information to search the information to be reproduced and displayed, more concretely, the information to search the video, audio or sub picture to be reproduced and displayed by the unit of the aforementioned VOB unit 30, the information to perform the aforementioned seamless reproduction, and the information to search the audio or sub picture synchronized with the video, are recorded or described as aforementioned.

These informations are classified as following.

(1) information to set a timing of each constitutional element in the reproducing apparatus described later, at a time of starting a certain operation specified by the audience (2) information to recognize a position on the DVD 1, which corresponds to the data division on the logical structure shown in FIG. 3, of the optical pickup of the reproducing apparatus described later (3) information to write only the data to be reproduced and displayed into a track buffer of the reproducing apparatus described later (4) information to indicate a record position (i.e. a target or destination position) on the DVD 1 of the data to be accessed (detected)

(5) protection information to protect the other data etc., if a desired data address cannot be searched at a time of searching the data for accessing.

Nextly, it is explained with reference to FIG. 5A, how to concretely record each of the above mentioned informations in the DSI data 51, to which the information classified in the above mentioned manner are to be recorded.

As shown in FIG. 5A, more concretely, the DSI data 51 is provided with: general information which is commonly used within one DSI data 51; seamless information to perform the seamless reproduction; angle jump destination information to perform an angle reproduction explained later; VOB unit search information to search a desirable VOB unit 30; and synchronous reproduction information which is the information related to the sub picture data 44 and audio data 43 to be reproduced and displayed in synchronization with the VOB unit 30 including the pertinent DSI data 51.

Here, the angle reproduction is explained in which the above mentioned angle jump destination information is applied. In the DVD 1 of the present embodiment, it is possible to record the video information of one scenery from a plurality of view points on a same time axis as for one movie (title 62), for example. Namely, more concretely, it is possible to record the video image of a scenery from a view point of an actor acting in the movie, and also record a video image of the same scenery from a view point of an actress acting in the movie. Then, these video images may be reproduced while exchanging these video images according to a selection by the audience, by an input operation during watching and listening to it, for example, which is called as an "angle change (or switch) reproduction".

Each information shown in FIG. 5A is explained in more detail. The general information includes: time information (i.e. the aforementioned SCR) to set a reproduction start timing of each constitutional element of the reproducing apparatus described later, as for a certain operation specified by the audience; a record position (e.g. a logical address) on the DVD 1 of each data to construct the logical structure shown in FIG. 3; protection information to protect, if the address of the desired data cannot be detected at the time of data search, other data etc.; and time information to perform a time search operation of the reproducing apparatus described later (e.g. elapse time information indicating an elapse time of the pertinent VOB unit 30 in the cell 20).

The seamless information includes: information indicating a record position (e.g. a logical address) on the DVD 1 of each data required for the seamless reproduction; and time information to set in advance the timing of connecting reproduced picture planes respectively in the seamless reproduction.

Further, the angle jump destination information includes address information indicating a record position on the DVD 1 of data to be reproduced so as to perform the angle change reproduction in the seamless manner (i.e. in the continuous manner) when changing the angle.

The VOB unit search information includes address information indicating a record position on the DVD 1 of the other VOB unit 30 to be reproduced, which is positioned in a predetermined area at the vicinity of the pertinent DSI data 51 (i.e. a record position of the other DSI data 51).

Finally, the synchronous reproduction information includes address information indicating a record position on the DVD 1 of the sub picture data 44 or the audio data 43 to be reproduced in synchronization with the VOB unit 30 including the pertinent DSI data 51.

By use of the DSI data 51 including each of the above described informations, the processes such as the time search operation (including the time search operation during the still picture reproduction) etc., can be performed by the reproducing apparatus described later.

Nextly, the PCI data 50 related to the present invention is explained with reference to FIG. 5B.

The PCI data 50 includes reproduction display control information to reproduce and display the information searched on the basis of the DSI data 51 as described above, i.e. the information to control changing of the display content in synchronization with the reproducing condition of the video data 42, the audio data 43 and the sub picture data 44 in the VOB unit 30, which are searched on the basis of the DSI data 51.

These informations in the PCI data 50 are classified as following.

(1) reproduction display control information as for the video, audio and sib picture which are being actually displayed (2) output information of each data (3) information related to a so called user interface with the audience Nextly, it is explained with reference to FIG. 5B, how to record concretely each of the informations in the PCI data 50 in which the above classified informations are recorded.

As shown in FIG. 5B, the PCI data 50 is concretely provided with: general information commonly used in one PCI data 50; angle jump destination information to perform the angle change reproduction in a non-seamless manner; and the aforementioned high light information.

Here, the angle change reproduction in the non-seamless manner is explained. Namely, the angle jump destination information included in the DSI data 51 (in FIG. 5A) is applied to the angle change reproduction in the seamless manner, in which the video image is not stopped or discontinued at the time of changing or switching the scenery in the angle change reproduction. The angle change reproduction in the non-seamless manner, to which the angle jump destination information in the PCI data 50 (in FIG. 5B) is applied, is an angle change reproduction, in which the video image is temporarily stopped at the time of switching or changing the scenery, and in which the angle is changed or switched by jumping the optical pickup to a record position on the DVD 1 where the video to be nextly reproduced is recorded while the video image is being stopped. Although the angle can be continuously changed in the aforementioned seamless angle change reproduction, the changing is performed after the track buffer of the reproducing apparatus described later is filled up with the reproduced data by reproducing the data until a predetermined record position on the DVD 1, so as to guarantee the continuity upon angle changing. Thus, the time delay may be generated at the time of changing the angle according to the seamless angle change reproduction. On the contrary to this, although the video image is temporarily stopped at the time of changing the angle in the non-seamless angle change reproduction, it has a characteristic that the time delay is not generated upon changing the angle.

The informations shown in FIG. 5B are further explained. The general information includes: information related to the attribute of the VOB unit 30, in which the pertinent PCI data 50 is recorded; information related to the reproduction display control of the pertinent VOB unit 30; information related to the permission or prohibition of the user interface; display control information as for a certain operation specified by the audience; the reproduction display start time information and the reproduction display end time information on the axis of the reproduction time, of the video data 42, the audio data 43 and the sub picture date 44 in the VOB unit 30, which includes the pertinent navi-pack 43, and the still picture reproduction end time information on the axis of reproduction time in case of still-picture-reproducing the video data 42 in the pertinent VOB unit 30; and the elapsed time information at the time of reproducing the data in the cell 20 of the pertinent VOB unit 30.

The angel jump destination information includes: address information indicating the record position on the DVD 1 of the data to be reproduced for performing the angle change reproduction by changing the angle in the non-seamless manner.

The high light information includes: effective time interval information indicating an effective time interval during which the selection button displayed on the menu picture plane etc. can be effectively operated in correspondence with each selection branch for the audience to select (which is defined as start and end times of the effective time interval, and which may be set effective over a plurality of VOB units 30); color information to display the color of the selection button with changing the color on the basis of the selecting operation by the user; position information indicating the display position corresponding to the selection button; movement information indicating the movement destination when the movement operation of a cursor indicating that the selection button is selected is performed on the basis of the selecting operation by the audience; and command information corresponding to each selection button and indicating the operation to be performed when the selection button is selected (e.g. information to set the register in the system controller as aforementioned).

As for this high light information in more detail, the information recorded in the high light information is related to a selection button displayed by use of the data recorded in the sub picture data 44, and the selection branches corresponding to the selection items are displayed such that they are superimposed on the video image displayed on the basis of the video data 42 (which is included in the VOB unit 30).

Figure 6:
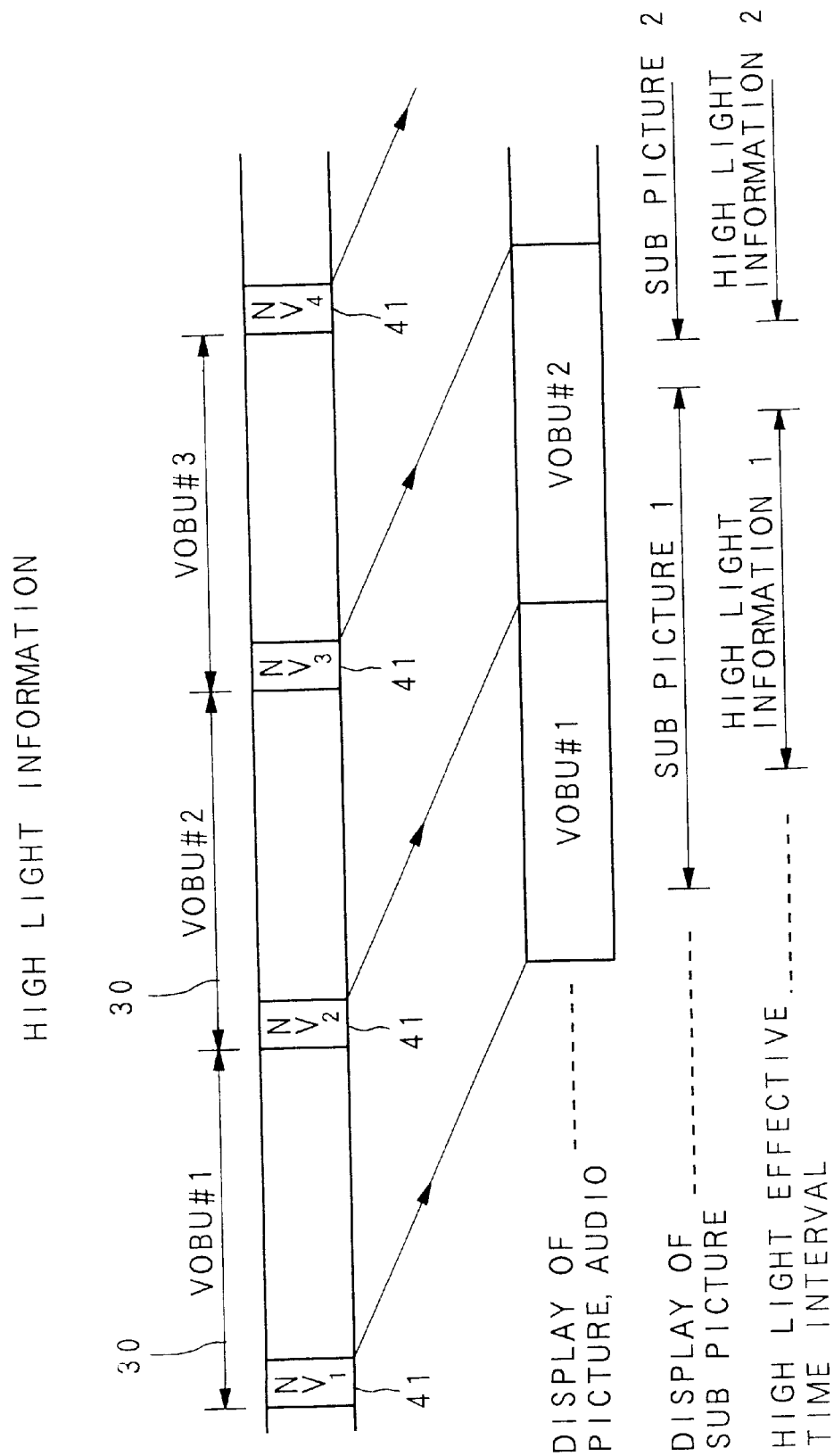
FIG. 6 is a diagram showing high light information.

Therefore, there may be a case where the selection button is successively displayed even if the video image is updated, and where it is necessary to determine the time interval, during which the operation selected by the selection button is effective (i.e., a case where the time interval, during which the VOB unit 30 corresponding to the high light information is displayed, and the effective time interval of the selection of the selection button based on the high light information are different from each other). Thus, the present embodiment is constructed such that the effective time interval information is stored which indicates the effective time interval, during which the selection button can effectively perform the selection operation, in the high light information, so that one high light information may be made effective with striding over a plurality of VOB units 30, as shown in FIG. 6.

In order to utilize the high light information having the information independent from the video image as described above, the high light information is separated from the pertinent PCI data 50 by a decoder for decoding the PCI data 50, and is decoded by an exclusive high light decoder in the reproducing apparatus described later.

By using the PCI data 50 including various information as explained above, it is possible to perform various processes such as the still picture reproduction, the display of the elapsed time from the beginning of the record information during the still picture reproduction, the non-seamless angle switching reproduction, the selecting operation with the menu picture plane corresponding to the highlight information and so on, in the reproducing apparatus.

Next, various embodiments of a physical construction of the above mentioned VOB unit 30 (refer to FIG. 1) recorded as the record information are explained with reference to FIG. 7. In FIG. 7, "Audio" indicates the audio data 43, "SP" indicates the sub-picture data 44 and "GOP" indicates the video data 42.

As shown in FIG. 7, following eight structures are contemplated as the physical construction embodiments of the VOB unit 30, at a time of recording the record information on the DVD 1 of the embodiment.

That is, the first embodiment is a VOB unit 30a including all of the video data 42, the audio data 43 and the sub-picture data 44 relative to one GOP 52 as a moving picture (i.e. a moving picture other than a still picture). In this case, the corresponding audio sound and sub-picture at a time of reproducing the video data 42 as the moving picture are reproduced and displayed.

The second embodiment is a VOB unit 30b including the video data 42, the audio data 43 and the sub-picture data 44 relative to a plurality of GOPs 52 as the moving picture. In this case, a plurality of GOPs 52 as the moving picture are reproduced, and the audio sound and sub-picture corresponding to them are reproduced and displayed in the same manner as the VOB unit 30a.

The third embodiment is a VOB unit 30c for reproducing the video data 42 relative to one GOP 52 as the moving picture and then still-picture-reproducing the last frame picture of this GOP 52, and further including the audio data 43 and the sub-picture data 44 corresponding to these moving pictures and the still picture following thereto. In this case, after one GOP 52 as the moving picture is reproduced, the last frame picture thereof is still-picture-reproduced and then the audio sound and the sub-picture corresponding to them are reproduced and displayed. At this time, the sequence end code S is written at the end of the video data 42 where the moving picture reproduction is to be changed to the still picture reproduction. When detecting this sequence end code S, decoding of the video data 42 in the reproducing apparatus described later is stopped, and only the last frame picture is repeatedly displayed.

The fourth embodiment is a VOB unit 30d including only the audio data 43 and the sub-picture data 44 and not including the video data 42 at all. In this case, the frame picture corresponding to video data 42 to be still-picture-reproduced which is included in another VOB unit 30 prior to the VOB unit 30d is continuously reproduced, while the audio data 43 and the sub-picture data 44 included in the VOB unit 30d are reproduced and displayed. At this time, still picture reproduction completion time information, at which the still picture reproduction of the video data 42 that is presently still-picture-reproduced is to be ended or finished, is written in the PCI data 50 included in the navi-pack 41.

The fifth embodiment is a VOB unit 30e including only the video data 42 relative to one GOP 52 as the moving picture and the corresponding sub-picture data 44. In this case, only the moving picture corresponding to the video data 42 and the sub-picture corresponding to the sub picture data 44 are displayed, while the audio sound may not be outputted, or the audio data 43 corresponding to the video data 42 and the sub-picture data 44 included in the VOB unit 30e may be included in another VOB unit 30 prior to the VOB unit 30e.

The sixth embodiment is a VOB unit 30f including only the video data 42 relative to a plurality of GOPs 52 as the moving picture and the corresponding sub-picture data 44. In this case, only the moving picture corresponding to the video data 42 and the sub-picture corresponding to the sub picture data 44 are displayed. In the same manner as the VOB unit 30e, the audio sound may not be outputted, or the audio data 43 corresponding to the video data 42 and the sub-picture data 44 included in the VOB unit 30f may be included in another VOB unit 30 prior to the VOB unit 30f.

The seventh embodiment is a VOB unit 30g for reproducing the video data 42 relative to one GOP 52 as the moving picture and then still-picture-reproducing the last frame picture of the GOP 52, and further including the sub-picture data 44 corresponding to these moving pictures and the still pictures following thereto. In this case, in the same manner as the VOB unit 30c, after one GOP 52 as the moving picture is reproduced, the last frame picture thereof is still-picture-reproduced, and then the sub-picture corresponding to it is reproduced and displayed.

Finally, the eighth embodiment is a VOB unit 30h consisting of only the navi-pack 41. In this case, for example, the video data 42 to be reproduced as a still picture, that is not accompanied with the audio sound or the sub-picture, is recorded in another VOB unit 30 prior to the VOB unit 30h, and the VOB unit 30h (i.e. the navi-pack 41) exists within the still picture reproduction time thereof. Here, the still picture reproduction completion time information of the still picture, that is now being reproduced, is included in the navi-pack 41 of the VOB unit 30h.

In each of the above mentioned VOB units 30a to 30h, it is not always required to include the sub-picture data 44, for the VOB units (30a to 30g) including the sub-picture data 44. It is determined by an author's intention whether or not the sub-picture data 44 is included.

Figures 8A, 8B:
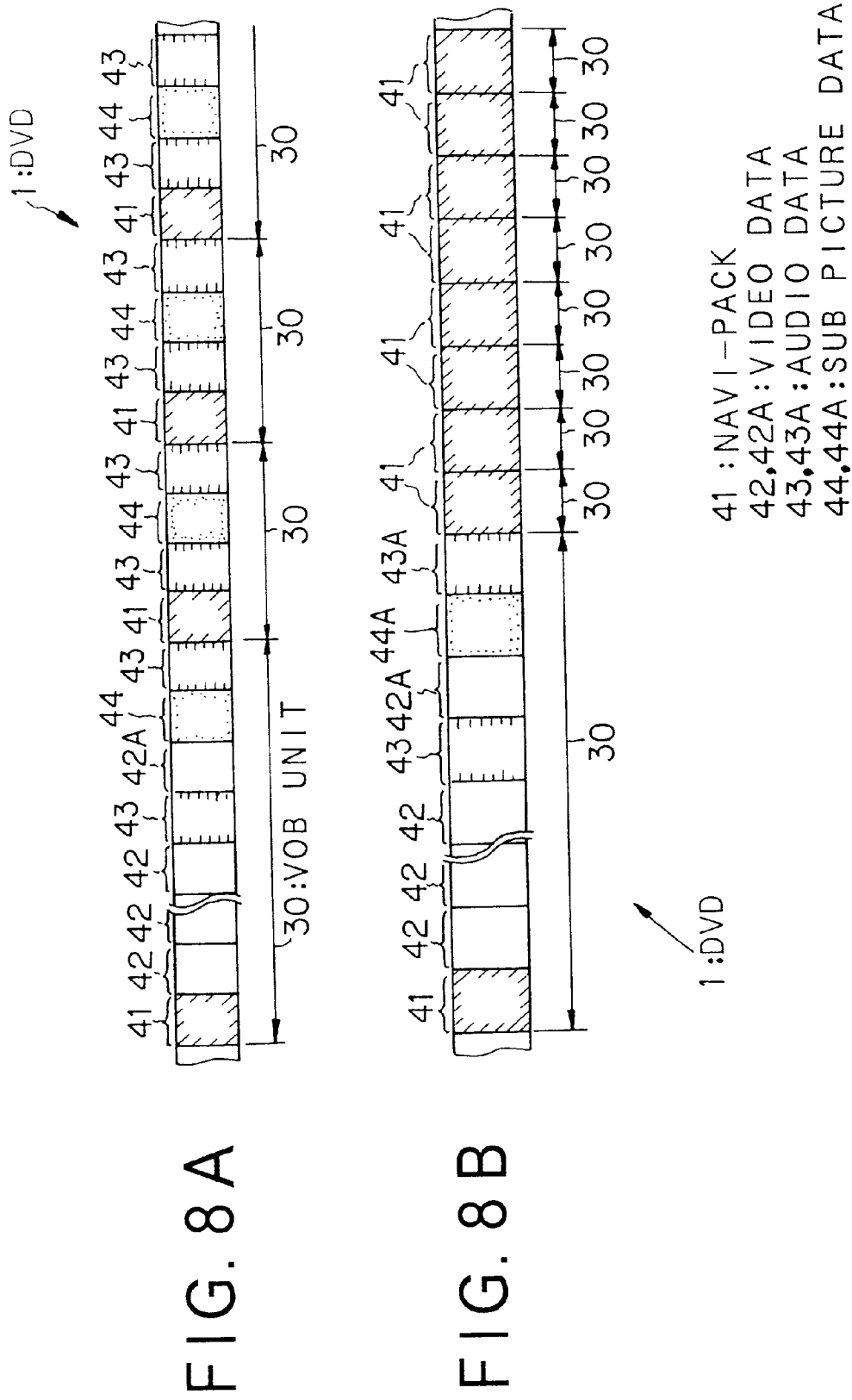
FIG. 8A is a diagram showing one example of recorded data arrangement including a plurality of VOB units on the DVD.
FIG. 8B is a diagram showing another example of recorded data arrangement including a plurality of VOB units on the DVD.

Examples of the physical structure of the record information by arranging the VOB units 30a to 30h of each of the above mentioned embodiments are shown in FIGS. 8A and 8B.

At first, in a case shown in FIG. 8A, the video data 42 is not included in the VOB units 30 other than the first VOB unit 30. Thus, in this case, after displaying a picture corresponding to the last video data 42A in the first VOB unit 30, the moving-picture-reproduction is changed to the still picture reproduction at the last frame picture of the last video data 42A. The audio sound and the sub-picture to be reproduced and displayed while this still picture reproduction is performed are recorded in the audio data 43 and the sub-picture data 44 included in the VOB units 30 after the first VOB unit 30.

Next, in a case shown in FIG. 8B, each of the VOB units 30 other than the first VOB unit 30 consists of only the navi-pack 41. Thus, in this case, after displaying a picture corresponding to the last video data 42A in the first VOB unit 30, the moving-picture-reproduction is changed to the still picture reproduction at the last frame picture of the last video data 42A. Then, the audio information included in the corresponding audio data 43A and the sub-picture included in the corresponding sub-picture data 44A are reproduced and displayed continuously while the VOB units 30, each consisting of only the navi-pack 41, are detected.

Figure 13:
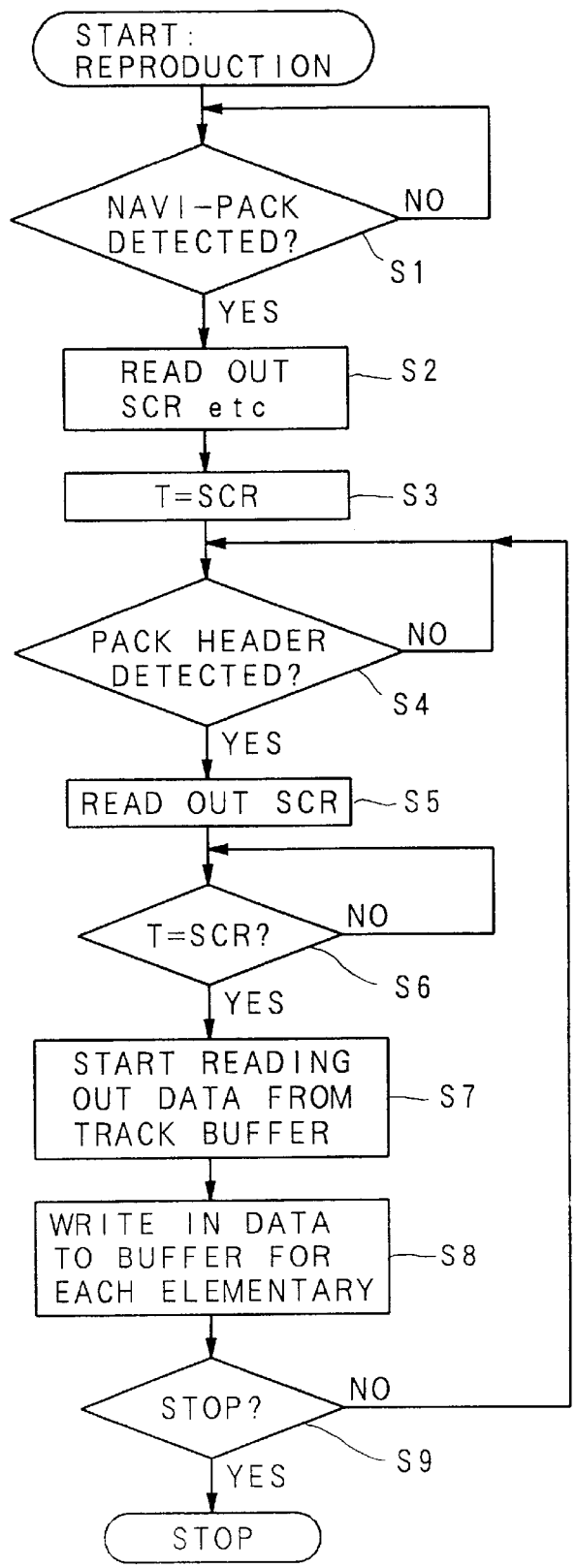
FIG. 13 is a flow chart showing a time management operation at the track buffer.

The tine of the still picture reproduction can be controlled on the basis of the number of the VOB units 30, each consisting of only the navi-pack 41, and the value of the above mentioned SCR written in the DSI data 51 within each of the navi-packs 41. This time management operation will be explained later (FIG. 13).

Even in a case of performing only the still picture reproduction and not performing the reproduction of the audio sound or the display of the sub-picture, the construction of the VOB units 30 are as shown in FIG. 8B.

A relationship between each data recorded on the DVD 1 and a position on the axis of reproduction time for each data is explained with reference to FIG. 9. In FIG. 9, the reference numerals 30a to 30h correspond to the respective VOB units 30a to 30d shown in FIG. 7.

As shown in FIG. 9, the video data 42, the audio data 43 and the sub-picture data 44 included in each of the VOB units 30 are reproduced and displayed at reproduction times on the axis of reproduction time, which respectively correspond to the reproduction display start time information, the reproduction display completion time information and the still picture reproduction completion time information, which are described in the PCI data 50 of the corresponding navi-pack 41. In FIG. 9, since the sequence end code S is described at the end of the video data 42A, the still picture reproduction is started form the last frame picture of the last GOP 52 included in the video data 42A, and the still picture reproduction is continued until the video data 42B is reproduced.

Here, in the audio data 43, the above mentioned PTS is described for each audio frame, which is a reproduction unit corresponding to the GOP in the video data 42. Further, in the sub-picture data 44, the PTS is described for each SPU (Sub Picture Unit), which is a reproduction unit corresponding to the GOP. Then, the reproduction time, at which each data is reproduced, is detected on the basis of these PTSs.

(II) Embodiment of Recording Apparatus

Next, an embodiment of recording apparatus for recording the above mentioned control information, video information and audio information onto the DVD 1 will be explained with reference to FIG. 10.

Figure 10:
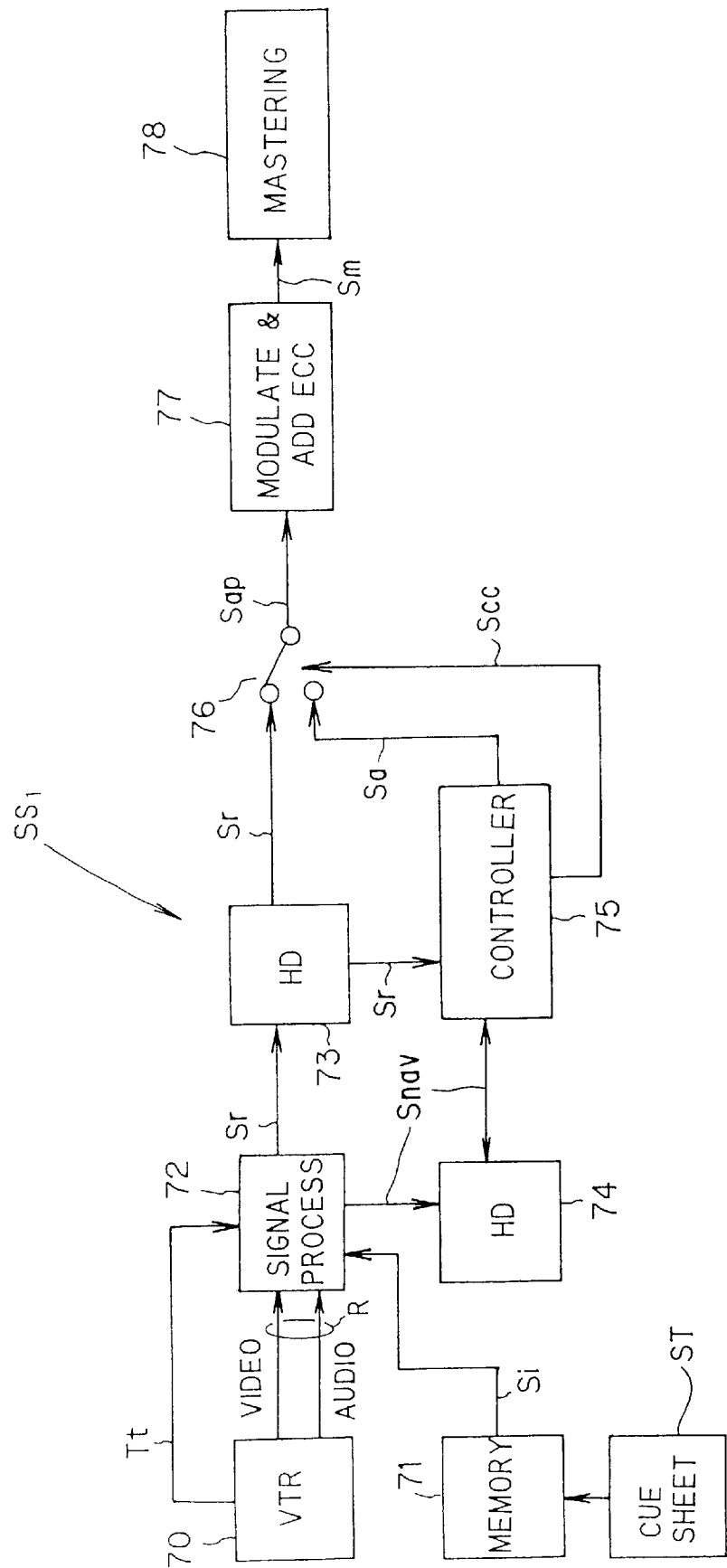
FIG. 10 is a block diagram of a recording apparatus as one embodiment of the present invention.

As shown in FIG. 10, a recording apparatus SS1 as the present embodiment is provided with: a VTR (Video Tape Recorder) 70; a memory 71; a signal process unit 71; a hard disk (HD) device 73; a hard disk (HD) device 74; a controller 75; a multiplexer 76; a modulator 77; and a mastering device 78.

Nextly, an operation of the present embodiment is explained.

Record information R, which is a raw material such as audio information, video information etc. to be recorded on the DVD 1, is temporarily recorded in the VTR 70. Then, the record information R temporarily record in the VTR 70 is outputted to the signal process unit 72 by a request from the signal process unit 72.

The signal process unit 72 applies an A/D (Analog to Digital) converting process and a signal compressing process to the record information R outputted from the VTR 70, and time-axis-multiplexes the audio information and the video information to output it as a compressed multiplexed signal Sr. After that, the compressed multiplexed signal Sr outputted therefrom is temporarily stored into the hard disk device 73.

Along with this, the memory 71 classifies the record information R into a plurality of partial record information Pr in advance, and temporarily stores control information related to the partial record information Pr which is inputted beforehand on the basis of a cue sheet ST, on which the control information for controlling the reproduction of the record information R (e.g. the video manager 2, the control data 11, and the navi-pack 41 including the PCI data 50 and the DSI data 51) are written. Then, the memory 71 outputs it as a control information signal Si on the basis of a request from the signal process unit 72. The information to divide the record information R into the VOB units 30, the information indicating to which position of the compressed multiplexed signal Sr the navi-pack 41 is inserted and so on are included in this control information.

Then, the signal process unit 72 separates or extracts the navi-pack 41 including the PCI data 50 and the DSI data 51 from the control information with referring to a time code Tt, and outputs them as a corresponding navi-pack information signal Snav, on the basis of the time code Tt corresponding to the record information R outputted from the VTR 70 and the control information signal Si outputted from the memory 71. Then, the navi-pack information signal Snav is temporarily stored in the hard disk device 74. At this time, control informations other than the navi-pack information signal Snav are, although they are not illustrated in FIG. 10, also respectively separated or extracted by the signal process unit 72 in the same manner as the navi-pack 41, and are stored into the hard disk device 74.

The above described processes are performed with respect to the whole record information R.

When the above described processes are finished as for the whole record information R, the controller 75 reads out the compressed multiplexed signal Sr from the hard disk device 73, reads out the navi-pack information signal Snav as well as other control informations from the hard disk device 74, generates additional information DA (including the navi-pack information signal Snav), which includes independently each of the navi-pack 41 and the other control informations, on the basis of these read out signals, and temporarily stores the additional information DA into the hard disk device 74. This is because there may be control information, which content is determined in dependence upon a generation result of the compressed multiplexed signal Sr among various control informations.

On the other hand, the controller 75 performs a time management for each of the operations of the signal process unit 72, the hard disk device 73 and the hard disk device 74, and reads out the additional information DA, which includes the navi-pack information signal Snav, from the hard disk device 74, so that the controller 75 generates and outputs an additional information signal Sa corresponding to the read out additional information DA, and generates and outputs an information selection signal Scc to time-axis-multiplex the compressed multiplexed signal Sr and the additional information signal Sa.

After that, the compressed multiplexed signal Sr (including the video data 42, the sub picture data 44 and the audio data 43 for each stream) and the additional information signal Sa are read out from the hard disk device 73 or 74 on the basis of the information selection signal Scc from the controller 75, and are time-axis-multiplexed by the multiplexer 76 to be outputted as an information added compressed multiplexed Sap. At this time, the writing of the PTS with respect to each data (i.e. the video data 42, the audio data 43 and the sub picture data 44) are performed in parallel, and the navi-pack 41 is inserted for each VOB unit 30. By this, the navi-pack 41 is to be always detected once every 0.4 seconds to 1 second, on the axis of reproduction time. The information to be recorded at the stage of this information added compressed multiplexed signal Sap has the physical structure (physical format) as shown in FIG. 1, as the control information, the video information and the audio information are multiplexed by the switching operation by use of the information selection signal Scc of the controller 75. And that, the PCI data 50 and the DSI data 51 are independently included in the navi-pack 41 respectively.

If there exists the sub picture information to be recorded in the informations to be recorded, it is inputted, by other means such as a hard disk device not illustrated, to the signal process unit 72, so that it is processed in the same manner as the video and audio information thereat, so that it is included in the information added compressed multiplexed signal Sap.

After that, the modulator 77 adds an error correction code (ECC), such as a Reed Solomon code, and applies a modulation such as an eight to sixteen (8–16) modulation with respect to the information added compressed multiplexed signal Sap outputted from the multiplexer 76, and generates and outputs a disk record signal Sm to the mastering device 78.

Finally, the mastering device 78 records the disk record signal Sm to a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated.

As mentioned above, according to the operation of the recording apparatus SS1 of this embodiment, since the navi-pack 41 having the PCI data 50 including the time information is recorded in each VOB unit 30, the navi-pack 41 is always detected once every 0.4 seconds to 1.0 second on the axis of reproduction time. Thus, when reproducing the record information R, even in a case where only the still picture is reproduced and the picture information is not included in the VOB unit 30, it is possible to reproduce the record information R while accurately carrying out the time management.

The navi-pack 41 includes the DSI data 51 to search the record position on the DVD 1 of the VOB unit 30 to be reproduced. Thus, at the time of reproducing the record information R, the record position of the VOB unit 30 to be accurately reproduced can be quickly searched and displayed. Further, it is possible to search the record information after a desired time period elapses while performing the still picture reproduction.

Moreover, the PCI data 50, which corresponds to the VOB unit 30 containing the still picture, includes the time information (e.g. the still picture reproduction completion time information) indicating the time interval during which the still picture is to be reproduced. Further, it is not required to record the frame pictures for the still picture, in the VOB unit 30 included in the reproduction time interval during which the still picture reproduction is performed. Therefore, it is possible to construct one VOB unit 30 from at least one of the sub-picture data 44 and the audio data 43 other than the video data 42, or to construct one VOB unit 30 from only the navi-pack 41. Thus, it is possible to use the PCI data 50 included in the navi-pack 41 to thereby perform the still picture reproduction accurately. Also, since it is not required to record the frame pictures corresponding to the time interval during which the still picture reproduction is performed, the record area on the DVD 1 can be effectively utilized without uselessness.

(III) Embodiment of Reproducing Apparatus

Next, an embodiment of reproducing apparatus for reproducing the information recorded on the DVD 1 by the above mentioned recording apparatus SS1 will be explained with reference to FIGS. 11 to 16.

At first, a construction and an operation of the reproducing apparatus as the embodiment is explained with reference to FIG. 11.

Figure 11:
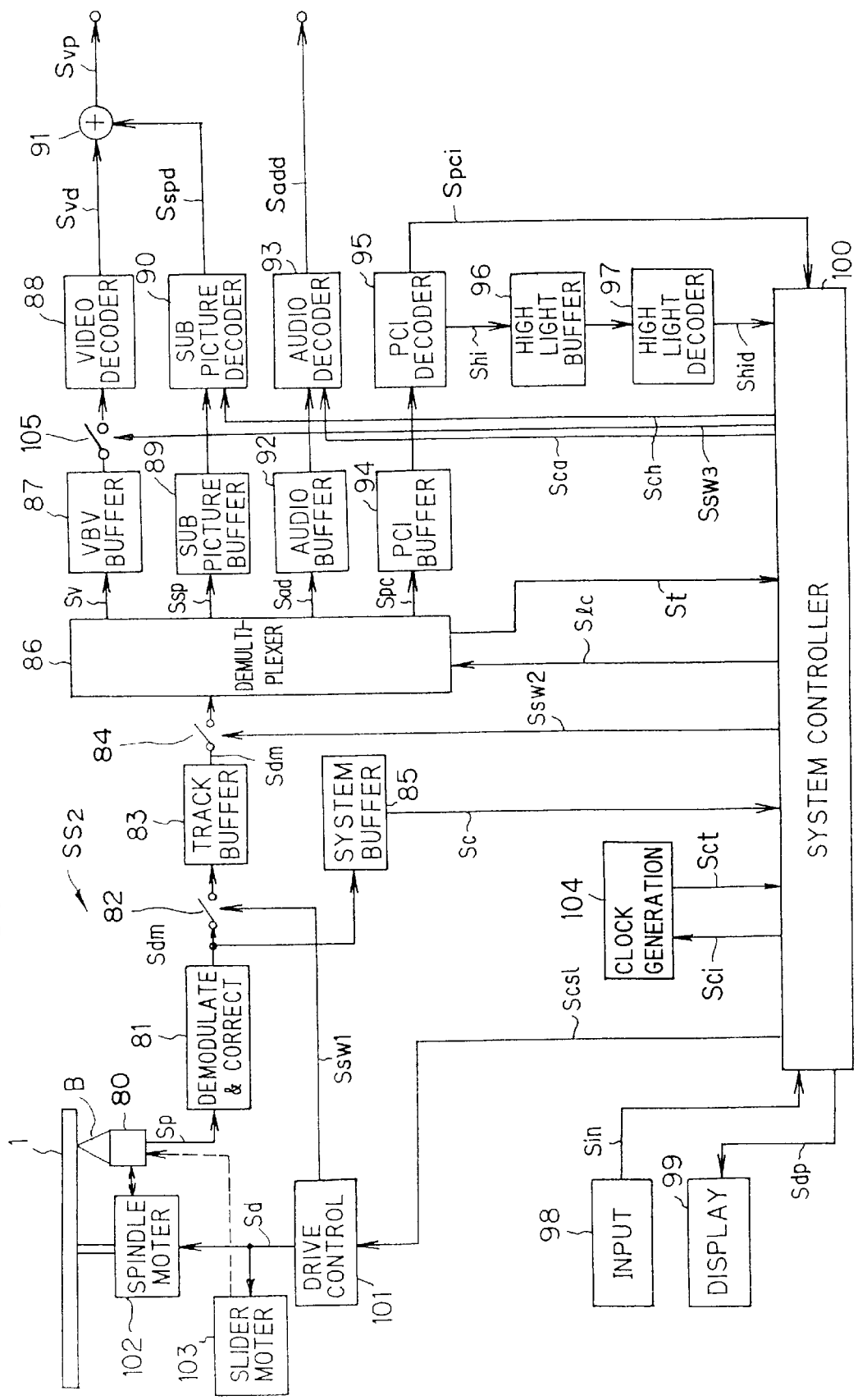
FIG. 11 is a block diagram of a reproducing apparatus as another embodiment of the present invention.

As shown in FIG. 11, a reproducing apparatus SS2 as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; a PCI (Presentation Control Information) buffer 94; a PCI decoder 95; a high light buffer 96; a high light decoder 97; an input unit 98; a display unit 99; a system controller 100; a drive controller 101; a spindle motor 102; a slider motor 103; a clock generation unit 104; and a buffer switch 105. The construction shown in FIG. 8 only illustrates the portions related to the video and audio reproduction of the reproducing apparatus SS2. The description and the detailed explanation as for servo circuits to servo-control the optical pickup 80, the spindle motor 102, the slider motor 103 and the like are omitted since they are constructed in the same manner as the conventional arts.

Nextly, an overall operation of the present embodiment is explained.

The optical pickup 80 includes a laser diode, a polarization beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm as it is to the track buffer 83. When it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed. The track buffer 83 compensates a difference or fluctuation in the data amount between respective GOP under the MPEG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the control information which is detected firstly upon loading the DVD 1 and which is related to the whole information recorded on the DVD 1 (e.g. the video manager 2 etc.), the control data 11 of the VTS 3 and the like (refer to FIG. 1). Then, the system buffer 85 outputs the accumulated data as one portion of a control information Sc to the system controller 100, and temporarily stores the DSI data 51 for each navi-pack 41 (refer to FIG. 1) while reproducing the information, to output it as another portion of the control information Sc.

The demultiplexer 86, to which the demodulation signal Sdm is continuously inputted through the stream switch 84, separates the video data 42, the audio data 43, the sub picture data 44 and the PCI data 50 for each navi-pack 41 respectively from the inputted demodulation signal Sdm, and outputs them as a video signal Sv, a sub picture signal Ssp, an audio signal Sad and a PCI signal Spc respectively to the VBV buffer 87, the sub picture buffer 89, the audio buffer 92 and the PCI buffer 94. There may be a case where, in the demodulation signal Sdm, different streams of the audio data 43 or the sub picture data 44 in a plurality of different languages are included as the audio or sub picture information. In that case, a desirable language is selected for the audio or sub picture information by a stream selection signal S1c from the system controller 100, so that the audio or sub picture information in the desirable language is outputted to the audio buffer 92 or the sub picture buffer 89.

On the other hand, the demultiplexer 86 detects only the pack header from each of the packs P for the video pata 42, the audio data 43 and the sub picture data 44 (refer to FIG. 1) through the stream switch 84. Then, the demultiplexer 86 reads out the SCR (i.e. the reading start time information) described in the pertinent packet header and the PTS (i.e. the reproduction display time information) for each data, and outputs a time information signal St including each of these informations to the system controller 100, The VBV buffer 87, to which the video signal Sv is inputted, consists of a FIFO memory, for example. The VBV buffer 87 temporarily stores the video signal Sv and outputs it to the video decoder 88 through the buffer switch 105 which is controlled by a switch signal Ssw3 from the system controller 100. The VBV buffer 87 compensates the difference or fluctuation in the data amount between respective pictures of the video signal Sv compressed by the MPEG 2 method (refer to FIG. 2). Then, the video signal Sv in which the differences in the data amount are compensated, is outputted to the video decoder 88, and is decoded by the MPEG 2 method to be outputted as a decoded video signal Svd to the mixer 91. The operation of the VBV buffer 87 will be described later in detail.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture data 44 included in the sub picture signal Ssp with the video data 42 corresponding to the sub picture data 44, and to output it. Then, the sub picture signal Ssp synchronized with the video data 42 is inputted to the sub picture decoder 90 and is decoded to be outputted as a decoded sub picture signal Sspd to the mixer 91.

In a case where the sub picture signal Ssp includes video information to construct a frame, a selection button etc. for displaying the menu picture plane, the sub picture decoder 90 changes a display condition of the selection button etc. to be displayed, in the sub picture signal Sspd on the basis of a high light control information Sch from the system controller 100 to output it.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, and delays the audio signal Sad in accordance with the output condition of the corresponding video information. Then, the audio signal Sad, which is time-adjusted to synchronize with the corresponding video information, is outputted to the audio decoder 93. Then, a predetermined decoding process is applied thereat to the audio signal Sad, and it is outputted as a decoded audio signal Sadd to a speaker etc. not illustrated. If it is detected by the system controller 100 that it is necessary to temporarily stop (pause) the audio sound in the reproduction immediately after accessing the desired information, a pause signal Sca is outputted from the system controller 100 to the audio decoder 93, so that the output of the decoded audio signal Sadd is stopped temporarily at the audio decoder 93.

The PCI buffer 94, to which the PCI signal Spc is inputted, consists of a FIFO memory, for example. The PCI buffer 94 temporarily stores the inputted PCI signal Spc and outputs it to the PCI decoder 95. The PCI buffer 94 is to synchronize the PCI data 50, which is included in the PCI signal Spc, with the video data 42, the audio data 43 and the sub picture data 44 corresponding to the PCI data 50, and apply the PCI data 50 to the video data 42, the audio data 43 and the sub picture data 44. Then, from the PCI signal Spc, which is synchronized with the corresponding the video data 42, the audio data 43 or the sub picture data 44 by the PCI buffer 94, high light information included in the PCI data 50 is separated or extracted by the PCI decoder 95, and is outputted as a high light signal Shi to the high light buffer 96. The portion of the PCI data 50 other than the high light information is outputted as a PCI information signal Spci to the system controller 100.

The high light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item, which corresponds to the high light information, in correspondence with the sub picture signal Ssp which includes the video information for the high light information. Then, the time-compensated high light signal Shi is decoded by the high light decoder 97, and the information included in the high light signal Shi is outputted as a decoded high light signal Shid to the system controller 100. The information to set the value of the register in the system controller 100 is included in this decoded high light signal Shid.

Here, the system controller 100 outputs the aforementioned high light control signal Sch to change the display condition by the high light information, on the basis of the decoded high light signal Shid. At this time, the system controller 100 receive the selecting operation by the input signal Sin from the input unit 98, so as to make effective or valid the selecting operation by use of the menu picture plane based on the high light information on the basis of the effective time interval information, which indicates the effective time interval of the high light information included in the decoded high light signal Shid, and outputs the aforementioned high light control signal Sch.

Further, on the basis of the control information Sc inputted from the system buffer 85, the time information signal St inputted from the demultiplexer 86, the PCI information signal Spci inputted from the PCI decoder 95 and an input signal Sin inputted from the input unit 98 such as a remote controller, the system controller 100 outputs the aforementioned switch signal Ssw2, the aforementioned switch signal Ssw3, the stream selection signal (e.g. a language selection signal) S1c, the pause signal Sca and the high light control signal Sch to correctly perform the reproduction corresponding to those input signals, and also outputs a display signal Sdp to display an operation condition etc. of the reproducing apparatus SS2 to the display unit 99 such as the liquid crystal device.

Furthermore, the system controller 100 outputs a seamless control signal Scs1 corresponding to the track jump process, to the drive controller 101, when it detects by the DSI information signal Sdsi (in the control signal Sc) etc. that it is necessary to perform the track jump process such as a search in order to perform the seamless reproduction.

Then, the drive controller 101, to which the seamless control signal Scs1 is inputted, outputs a drive signal Sd to the spindle motor 102 or the slider motor 103. By this drive signal Sd, the spindle motor 102 or the slider motor 103 moves the optical pickup 80 such that the record position to be reproduced on the DVD 1 is irradiated with the light beam B (refer to an arrow of a broken line in FIG. 11), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scs1, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

The clock generation unit 104 is initialized by a clock initialization signal Sci outputted from the system controller 100 on the basis of the time information signal St. The clock generation unit 104 generates a standard clock signal Sct including a reproduction standard clock T for controlling the whole of the reproducing apparatus SS2, and outputs it to the system controller 100. Then, the system controller 100 outputs the switch signals Ssw2 and Ssw3, the stream selection signal S1c, the pause signal Sca, the high light control signal Sch and the seamless control signal Scs1, on the basis of the standard clock signal Sct.

The operation of the track buffer 83 in the reproducing apparatus SS2 is especially explained with reference to FIGS. 12 and 13 (especially, as for the time management operation by use of the time information written in the navi-pack 41).

Figure 12:
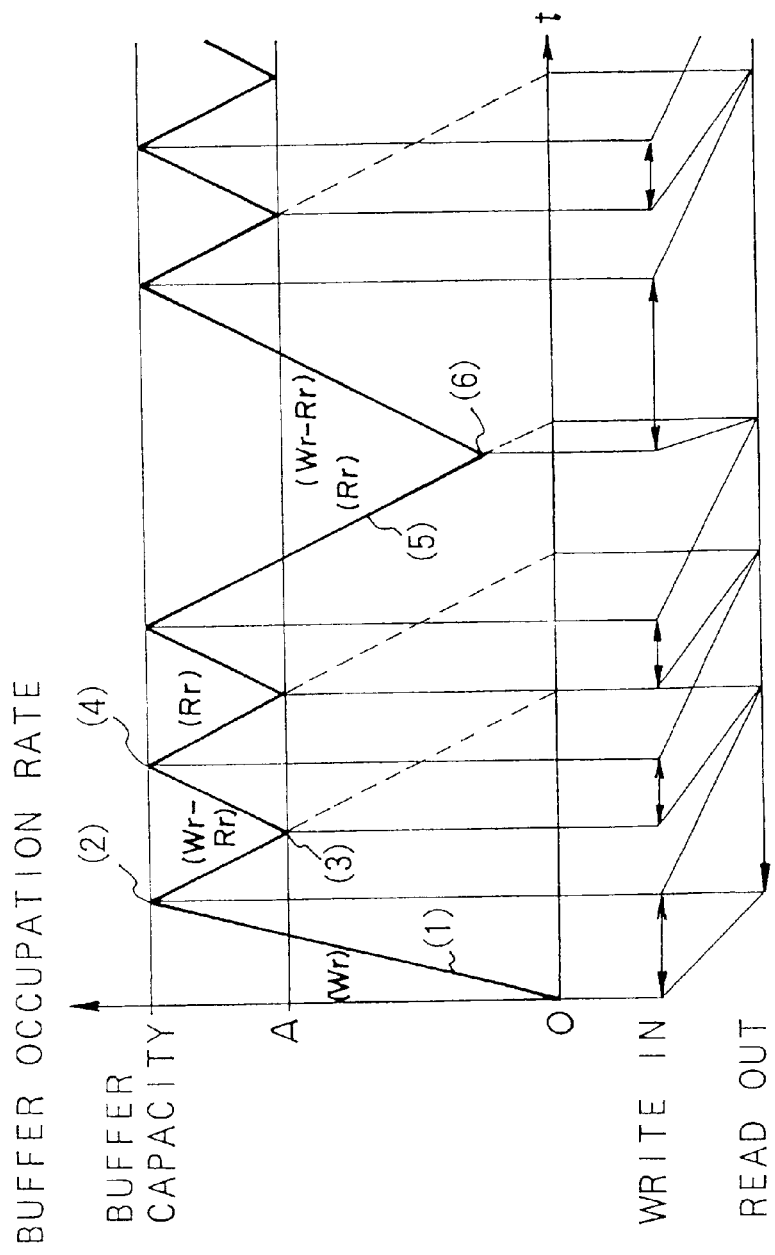
FIG. 12 is a diagram showing an operation of a track buffer of the embodiment in FIG. 11.

At first, with reference to FIG. 12, the general operation of the track buffer 83 is explained. FIG. 12 is a graph showing the change of the used information amount versus time of the track buffer 83 (i.e. the occupation amount) at writing in and reading out operations. In FIG. 12, a reference sign Wr represents a writing in rate of writing the information into the track buffer 83, while a reference sign Rr represents a reading out rate of reading out the information from the track buffer 83. In general, a following expression is affirmed.

$$Wr > Rr$$

As discussed above, the track buffer 83 operates as a FIFO memory to compensate the variable data rate in the MPEG 2 method, output the demodulation signal Sdm continuously, which is inputted discontinuously due to a track jump in the seamless reproduction etc., and dissolves stopping of the reproduction due to this discontinuity.

In FIG. 12, when the writing in operation of the demodulation signal Sdm to the track buffer 83 is performed (point (1) in the graph), the buffer occupation rate of the track buffer 83 is increased. This writing in operation is performed by closing the stream switch 82, on the basis of the switch signal Ssw1.

Then, when the track buffer 83 is occupied to its maximum capacity (point (2)), the stream switch 82 is opened to temporarily stop writing in so as to prevent the over-flow of the track buffer 83, and the stream switch 84 is closed so as to start reading out. Then, when the buffer occupation rate is decreased to be a predetermined occupation rate A, which is set in advance so as to prevent the under-flow of the track buffer 83 (i.e. the condition where the track buffer 83 is empty and it is not possible to read out the demodulation signal Sdm therefrom), the stream switch 82 is closed, so that the writing in operation is restarted by the writing in rate Wr (point (3)), while it is continued to read out the demodulation signal Sdm from the track buffer 53 at the reading out rate Rr. The increasing rate of the buffer occupation amount is equal to (Wr−Rr).

Then, when the track buffer 83 is occupied up to its maximum capacity again (point (4)), the writing in operation is temporarily stopped, and only the reading out operation is performed (by the reading rate Rr).

After this, as these operations are repeated, the writing in operation to the track buffer 83 is intermittently performed while the reading out operation is continuously performed as shown in a lower portion of FIG. 12. At this time, the value of the reading out rate Rr can be set to be any value as long as it is smaller than the writing in rate Wr, and it is not necessary to fix the reading out rate Rr constant. Thus, in correspondence with the data amount per unit time of the demodulation signal Sdm detected by the variable rate under the MPEG 2 method, the reading out rate Rr may be set relatively high if this data amount per unit time is large, while the reading out rate Rr may be set relatively low, if the data amount per unit time is small.

In case that the optical pickup is jumped in order to perform the data search operation, even if the time required for writing into the track buffer 83 is prolonged (point (5)), it is possible to prevent the reading out operation from being stopped by starting the writing in operation before the occupation amount reaches to zero (point (6)).

Here, although the start of reading out the data is set at a time after the track buffer 83 is occupied to its maximum occupation amount, it is not limited to this. Instead, reading out may be started at a time before the occupation amount reaches its maximum, or reading out and writing in may be started simultaneously.

By the above explained action of the track buffer 83, the seamless reproduction can be performed in correspondence with the record information R by the variable rate method. Namely, the seamless reproduction or the reproduction in the variable rate method can be performed by connecting and continuously outputting the data written discontinuously, by use of the track buffer 83.

In the above explanations for the track buffer 83, the reading out operation of the data is continuous while the reading out rate Rr is variable. However, it is not limited to this. Instead, by intermittently performing the reading out operation of the data by a predetermined high rate Rh (Rh>"the maximum value of Rr") and by controlling or adjusting the length of the time interval during which the data is actually being read out, it is possible to deal with the variable rate method. Even this case is equivalent to a case where the reading out operation is continuously performed, in average by changing the reading out rate Rr. At this time, the smoothing of the data, which is read out intermittently, may be performed by each buffer at the posterior stage of the demultiplexer 86.

Here, as clearly understood from FIG. 12, the difference between the input time and the output time of one data at the track buffer 83 i.e. the delay time at the track buffer 83 is not constant but is changed greatly due to the reading out rate Rr. Further, even if a predetermined search operation is performed, since the data is continuously outputted, it is necessary to increase the buffer capacity of the track buffer 83 itself. Therefore, the delay time is inevitably prolonged.

At this time, assuming that the PCI data 50 and the DSI data 51 are not separated but are detected in one body at a prior stage of the track buffer 83, and that the control is made on the basis of these detected data, it would be difficult as for the control of the reproduction and display, to match the data, which is actually reproduced and displayed (i.e. the data output from the track buffer 83), and the timing of the PCI data 50, since the delay time is not constant at the track buffer 83, resulting in that the correct reproduction and display control would be difficult. On the other hand, assuming that the PCI data 50 and the DSI data 51 are detected in one body at the posterior stage of the track buffer 83, and that the control is made on the basis of these detected data, it would be difficult as for the data search to correlate the position of the optical pickup 80 (which is moved forward by an amount corresponding to the delay time of the track buffer 83) for the search with the DSI data 51 since the delay time of the track buffer 83 is not constant, resulting in that the correct search control would be difficult.

Therefore, in the present embodiment, by separating and recording the PCI data 50 and the DSI data 51, it is possible to perform the search control by extracting the DSI data 51 before the demodulation signal Sdm is inputted to the track buffer 83, while recognizing the position of the optical pickup 80 on the DVD 1, in the reproducing apparatus SS2. Further, it is possible to perform the reproduction and display control in correspondence with the video, audio or sub picture to which the display and reproduction control is performed, by extracting the PCI data 51 after the track buffer 83 outputs the demodulation signal Sdm.

Nextly, the time management operation by use of the time information described in the navi-pack 41 in the reading out operation of the track buffer 83 is explained, mainly as for the operation in the system controller 100, with reference to a flowchart shown in FIG. 13.

When the reproduction is started, it is firstly judged on the basis of the control signal Sc whether or not the navi-pack 41 is detected from the demodulation signal Sdm (Step S1). If it is not detected (Step S1; NO), it stands as it is until the navi-pack 41 is detected. If it is detected (Step S1; YES), the SCR included in the DSI data 51 included in the navi-pack 41 detected from the control signal Sc is read out, and other information included in the DSI data 51 is also read out (Step S2).

In order to initialize the clock generation unit 104, the clock initialization signal Sci including the SCR read out at the step S2 is outputted from the system controller 100. Then, the reproduction standard clock T, which is included in the standard clock signal Sct generated by the clock generation unit 104, is set to the value of the SCR read out at the step S2 (Step S3).

Next, it is judged, on the basis of the time information signal St from the demultiplexer 86, whether or not the pack header at the first pack P of data portion (i.e. the video data 42, the audio data 43 or the sub-picture data 44) of the VOB unit 30, in which the navi-pack 41 detected at the step S1 is included, is detected (Step S4). If it is not detected (Step S4; NO), it stands by until it is detected. If it is detected (Step S4; YES), the SCR described in the detected pack header is read out from the time information signal St (Step S5).

It is judged whether or not the reproduction standard clock T, which is generated by the clock generation unit 104, becomes equal to the SCR, which is read out at the step S5 (Step S6). If it does not become equal (Step S6; NO), it stands by until the reproduction standard clock T becomes equal to the value of the SCR read out at the step S5, without reading the pack P, in which the SCR is included, from the track buffer 83. If the reproduction standard clock T becomes equal to the SCR read out at the step S5 (Step S6; YES), the stream switch 84 is closed by the switch signal Ssw2. Then, the reading from the track buffer 83 of the pack P, in which the SCR is included, is started (Step S7). Then, the read pack P is inputted to the demultiplexer 86, and is separated into the video data 42, the audio data 43 and the sub-picture data 44, respectively.

Each separated data in the pack P is written to respective one of the buffers (i.e. the VBV buffer 87, the sub-picture buffer 89, then audio buffer 92 and the PCI buffer 94) for each elementary (here, the elementary is a generic name for the video, the audio, the sub-picture or the like) (Step S8). Next, it is judged whether or not the input signal Sin to stop the reproduction is inputted from the input unit 98 (Step S9). If it is not inputted (Step S9; NO), the operation returns to the step S4 so as to read out a next pack P. If it is inputted (Step S9; YES), the process is ended, and the reproduction is stopped.

Next, operations (especially, the time management operation by use of the time information described in the pack header) of the buffers for each elementary are explained with reference to a flow chart shown in FIG. 14.

Figure 14:
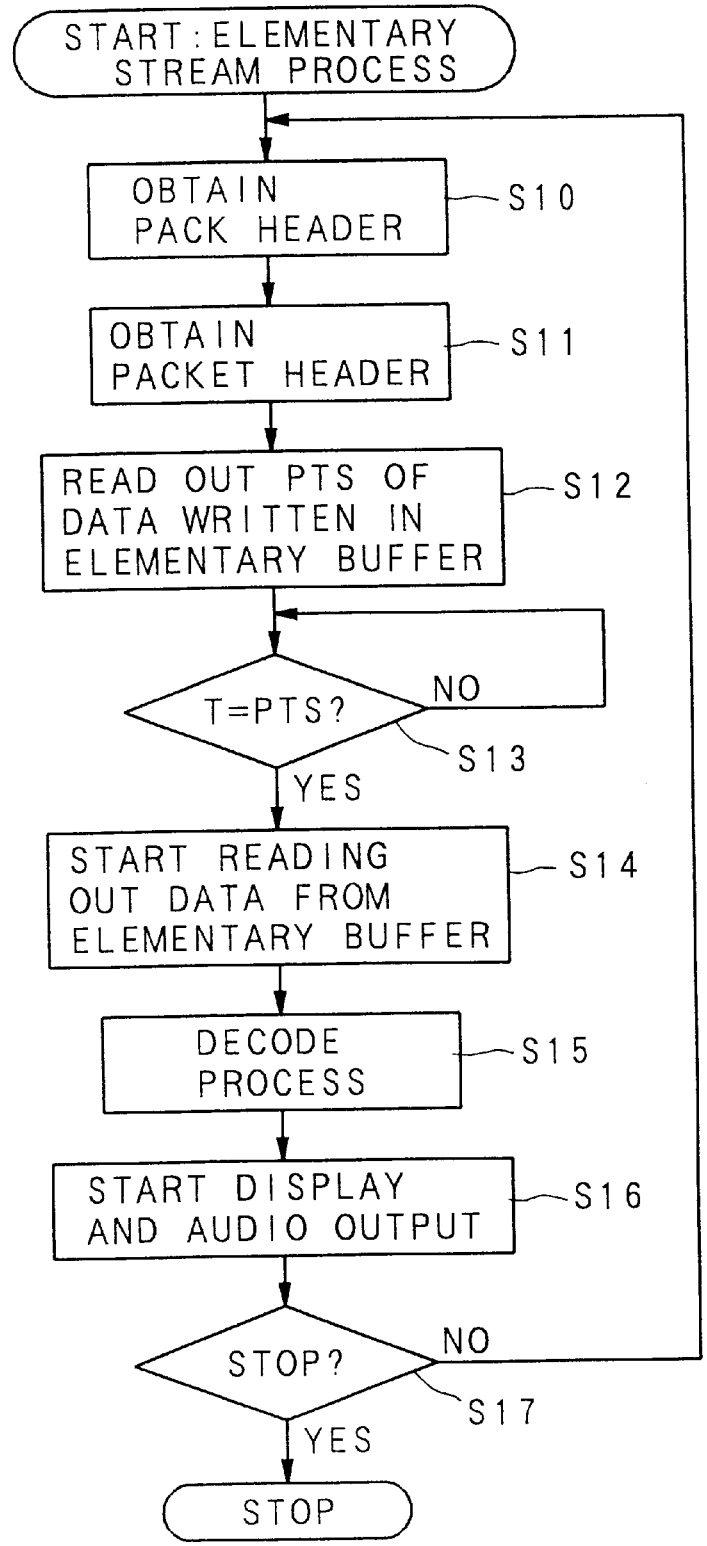
FIG. 14 is a flow chart of a time management operation at the buffer for each elementary.

As shown in FIG. 14, when the data corresponding to the respective buffers for each elementary is inputted, the pack header of the pack P of the inputted data is firstly read out (Step S10). Then, the packet header of the packet included in this pack is read out (Step S11).

When the pack header and the packet header are obtained (Steps S10 and S11), the PTS described in the data inputted to the buffer is read out (Step S12). Then, it is judged whether or not the reproduction standard clock T outputted by the clock generation unit 104 is equal to each of the read PTS (Step S13). If it is not equal to the read PTS (Step S13; NO), it stands by without reading out the data from the respective buffers for each elementary, until the reproduction standard clock T becomes equal to the read PTS. If it becomes equal to the read PTS (Step S13; YES), reading out the data from the respective buffers for each elementary is started (Step S14), and decoding processes are started at the respective decoders (i.e. the video decoder 88, the sub-picture decoder 90, the audio decoder 93 and the PCI decoder 95) for each elementary (Step S15). At this time, as for the video signal Sv, if the reproduction standard clock T becomes equal to each read PTS (Step S13; YES), the switch signal Ssw3 is outputted from the system controller 100, so that the buffer switch 105 is closed, and the video signal Sv is outputted to the video decoder 88 therethrough.

If the decoding processes are ended at the respective decoders for each elementary (Step S15), the demodulation video signal Svd, the demodulation sub-picture signal Sspd, the demodulation audio signal Sadd and the PCI information signal Spci are respectively outputted as the decode results. Then, the picture and the sub-picture are displayed, and the audio sound is reproduced (Step S16).

After that, it is judged whether or not the input signal Sin to stop the reproduction is inputted from the input unit 98 (Step S17). If it is not inputted (Step S17; NO), the operation returns to the step S10 so as to read out the packet header of a next pack P. If it is inputted (Step S17; YES), the process is ended, and the reproduction is stopped.

From the above mentioned time management operation, the synchronization of each data can be obtained. Further, in case that the video data 42 includes the data to be still-picture-reproduced, since the VOB unit 30 has a construction as shown in FIGS. 8A or 8B for example, the still picture reproduction can be performed while carrying out the accurate time management by the SCR described in each navi-pack 41. Furthermore, as mentioned above (refer to FIG. 13), each time the navi-pack 41 is detected, the reproduction standard clock T is being updated by the SCR described in the navi-pack 41 while the reproduction is being performed. Thus, even during the still picture reproduction, for example, it is possible to display the reproduction elapse time from the head or beginning of the title 62.

Figure 15:
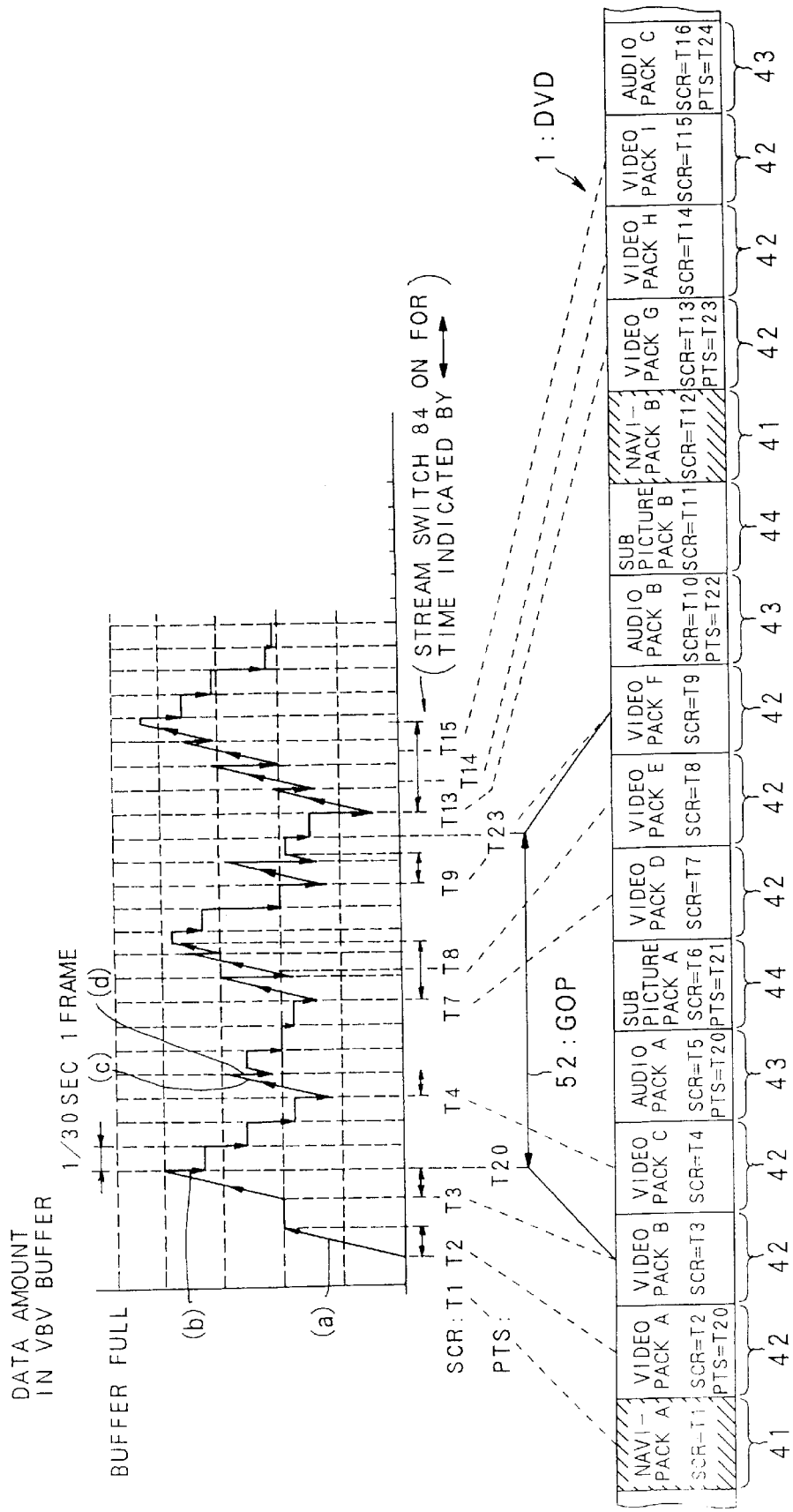
FIG. 15 is a diagram showing the relationship between the time changes of written in data and read out data at the VBV buffer and the data recorded on DVD.

Next, the operations at the respective buffers for each elementary are explained, with the operation at the VBV buffer as a representation, by using FIG. 15. A lower stage of FIG. 15 shows a state of the DVD 1, in which each data is recorded as the pack P, from the navi-pack (A) 41. In FIG. 15, the pack P corresponding to the video data 42 is referred to as a video pack, the pack P corresponding to the audio data 43 is referred to as an audio pack, and the pack P corresponding to the sub-picture data 44 is referred to as a sub-picture pack. One GOP 52 is composed of the video data 42 included in the video packs ranging from the video pack (A) 42 to the video pack (F) 42. Thus, each PTS is described in the video pack (A) 42 (i.e. the first video pack in the pertinent GOP 52) and the video pack (G) 42 (i.e. the first video pack in another GOP 52 next to the pertinent GOP 52). Further, an upper stage of FIG. 15 shows the writing of the video signal Sv into the VBV buffer 87 and the reading out of the video signal Sv from the VBV buffer 87, on the basis of the SCR and the PTS described in each pack P, together with the time change of data amount in the VBV buffer 87 in relation to each of the writing and the reading.

As shown in FIG. 15, when the navi-pack (A) 41 is firstly detected, the clock generation unit 104 is initialized by the SCR included in the pertinent navi-pack A41 (refer to the step S3 of FIG. 13). Then, when the pack header of the video pack (A) 42, which is the next data after the navi-pack (A) 41, is detected (refer to the step S4 of FIG. 13), the SCR described in the video pack (A) 42 (in FIG. 15, SCR=T2) is read out (refer to the step S5 of FIG. 13). Then, the stream switch 84 is closed at a timing when it becomes the SCR (=T2), and reading out the video pack (A) 42 from the track buffer 83 is started. The video data included in the video pack (A) 42 is written into the VBV buffer 87 through the demultiplexer 86 (a graph portion (a) in FIG. 15, refer to the steps S7 and S8 of FIG. 13). Then, if it becomes the PTS described in the video pack (A) 42 (PTS=T20 (in FIG. 15, T3<T20<T4)) at a time when the writing of the video pack (B) 42 is ended, the buffer switch 105 is closed. Then, the reading is started from the data of the video pack (A) 42 for each frame picture (a graph portion (b) in FIG. 5, refer to the step S14 of FIG. 14), and the decode process at the video decoder 88 is performed (refer to the steps S15 and S16 of FIG. 14). Then, when it becomes the timing T4, the writing into the VBV buffer 87 of the video pack (C) 42 is started (a graph portion (c) in FIG. 15, refer to the steps S7 and S8 of FIG. 13). Then, when a time corresponding to one frame picture elapses, the buffer switch 105 is closed, and the reading out is started (a graph portion (d) in FIG. 15). After that, the writing into the VBV buffer 87 at the timing of the SCR described in the pack header of each pack P and the reading out after the time corresponding to one frame picture elapses are repeatedly performed. Then, when it becomes the PTS described in each pack header, each GOP 52 is displayed.

Similar operations are performed in the sub-picture buffer 89 and the audio buffer 92 other than the VBV buffer 87. That is, the reading out from the track buffer 83 at the timing of the SCR described in the pack header of each corresponding pack P, the writing into each buffer and the reading out after the time corresponding to one frame elapses are repeatedly performed. Then, when it becomes the PTS described in each pack header, each data is reproduced or displayed.

Next, the reason why the length of one VOB unit 30 is prescribed to be not shorter than 0.4 seconds and not longer than 1 second on the axis of reproduction time, is explained by using an operation of the PCI buffer 94 corresponding thereto, with reference to FIG. 16.

As explained before, the PCI buffer 94 is to synchronize the PCI data 50 with the video data 42, the audio data 43, the sub picture data 44 or the like corresponding to the pertinent PCI data 50, so as to apply the PCI data 50 to the video data 42, the audio data 43, the sub picture data 44, or the like.

Therefore, it is necessary that the PCI buffer 94 holds the inputted PCI data 50 until the decoding operations for the video signal Sv etc. corresponding to the PCI data 50 included in the PCI signal Spc, which is inputted to the PCI buffer 94, are respectively finished by the video decoder 88, the sub picture decoder 90 and the audio decoder 93 shown in FIG. 11, and that the PCI buffer 94 outputs the held PCI data 50 to the PCI decoder 95 when the decoding operations for the video signal Sv etc. are respectively finished. From this analysis, as the memory capacity of the PCI buffer 94, a memory capacity enough to hold all of pieces (i.e. the packets PTs in FIG. 1) of the PCI data 50 independently, which are successively inputted thereto until the decoding operations for the video signal Sv etc. are respectively finished.

By the way, it is prescribed by the MPEG 2 standard that the delay tine due to the decoding operation of the video signal Sv etc., is 1 second at the maximum, and that the whole decoding operation is completed within 1 second. Therefore, as the maximum memory capacity of the PCI buffer 94, the memory capacity enough to store all of the successive pieces (the packets PTs) of the PCI data 50 independently (more particularly, for each unit of the packet PT for storing the PCI data 50 as shown in FIG. 1), which are inputted within 1 second is required.

Therefore, in the present embodiment, the lower limit value of the reproduction time period corresponding to the data recorded between the two adjacent navi-packs 41 is set to 0.4 second as explained before, and the number of the pieces (the packets PTs) of the PCI data 50, which are inputted to the PCI buffer 94 while the video signal Sv etc. are respectively being decoded, is set to "3" at the maximum. By setting like these, as shown in FIG. 16, even if it takes the maximum time period to decode the video signal Sv etc. and the actually outputted data is delayed by 1 second, the number of the pieces (the packets PTs) of the PCI data 50 which are inputted into the PCI buffer 94 during this time period (i.e. the PCI data 50 represented as a PCI 1, a PCI 2 and a PCI 3 in FIG. 16) is not more than "3". Therefore, as the memory capacity of the PCI buffer 94, the memory capacity corresponding to the data amount of 3 pieces (i.e. 3 packets PTs) of the PCI data 50, so that the miniaturization of the PCI buffer 94 is promoted and the low cost thereof can be realized.

As explained above, according to the reproducing apparatus SS2 of this embodiment, since the navi-pack 41 containing the PCI data 50 including the time information is reproduced for each VOB unit 30, the navi-pack 41 is always detected once every 0.4 seconds to 1.0 second on the axis of reproduction time. Thus, even in a case of reproducing only the still picture in which the video information is not included in the VOB unit 30, it is possible to reproduce the record information R while accurately carrying out the time management. As a result, even during the still picture reproduction, it is possible to display the reproduction elapse time from the head or beginning of the title 62.

The navi-pack 41 includes the DSI data 51 to search the record position on the DVD 1 of the VOB unit 30 to be reproduced. Thus, the record position of the VOB unit 30 to be accurately reproduced can be quickly searched and displayed, when the record information R is reproduced. Further, it is possible to perform the time search operation of searching the record information after the desired time elapse while performing the still picture reproduction.

Moreover, the PCI data 50 corresponding to the VOB unit 30, which contains the still picture in the record information R, includes the time information (i.e. the still picture reproduction completion time information) indicating the time when the still picture is to be reproduced. Further, it is not required to record the frame pictures for the still picture, into the VOB unit 30, which is included in the reproduction time duration during which the still-picture-reproduced is performed. Furthermore, it is possible to construct at least one of the sub-picture data 44 and the audio data 43 other than the video data 42 or to construct one VOB unit 30, out of only the navi-pack 41. Thus, it is possible to use the PCI data 50 included in the navi-pack 41 to thereby perform the still picture reproduction accurately. Also, since it is not required to record the still picture information corresponding to the time duration during which the still picture reproduction is performed, the record area on the DVD 1 can be effectively utilized without uselessness.

In each of the above described embodiments, the explanations have been done for the case where the information compressed by the variable rate by means of the MPEG 2 method is recorded on the DVD 1, and the case where the information recorded in that manner is reproduced. However, the present invention is not limited to these cases. Instead, as long as a reproducing system utilizes the track buffer at the time of reproduction, a constant rate compression method may be employed as the compression method in the present invention. Further, it is possible to apply the present invention to the recording and reproducing operations of various information regardless of the compression methods. Furthermore, the embodiment of the information record information is not limited to the aforementioned DVD 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information recording apparatus comprising:

signal process means for applying a predetermined signal process to record information, thereby obtaining a plurality of processed partial record information pieces, each corresponding to a predetermined reproduction time interval;

control information generating means for generating search reproduction control information including time information indicating a reproduction time when each of said processed partial record information pieces is to be reproduced, and including search information indicating addresses of other processed partial record information pieces;

multiplex means for multiplexing said processed partial record information pieces and said search reproduction control information in order to form a plurality of multiplexed partial record information; and record means for recording said plurality of multiplexed partial record information onto an information recording medium, wherein at least one of said multiplexed partial record information includes video information containing still picture information which is subject to still picture reproduction, and wherein in a case when said reproduction time during which said still picture reproduction is to be performed is included in said predetermined reproduction time interval, said multiplexed partial record information corresponding to said reproduction time of said still picture information contains no video information.

2. The apparatus according to claim 1, wherein said search reproduction control information is located at a beginning portion of each of said plurality of multiplexed partial record information.

3. The apparatus according to claim 1, wherein each of said multiplexed partial record information includes at least one of video information containing still picture information which is a subject to still picture reproduction, sub-picture information to be superimposed on said video information, and audio information.

4. The apparatus according to claim 1, wherein said multiplexed partial record information corresponding to said reproduction time of said still picture information includes at least one of sub-picture information and audio information to be reproduced during said still picture reproduction.

5. The apparatus according to claim 1, wherein said multiplexed partial record information containing no video information consists of only said search reproduction control information.

6. An information recording medium comprising:

a plurality of processed partial record information pieces, each corresponding to a predetermined reproduction time interval; and search reproduction control information including time information indicating a reproduction time when each of said processed partial record information pieces is to be reproduced, and including search information indicating addresses of other processed partial record information pieces, wherein said processed partial record information pieces and said search reproduction control information are multiplexed in order to form a plurality of multiplexed partial record information, wherein at least one of said multiplexed partial record information includes video information containing still picture information which is a subject to still picture reproduction, and wherein in a case when said reproduction time during which said still picture reproduction is to be performed is included in said predetermined reproduction time interval, said multiplexed partial record information corresponding to said reproduction time of said still picture reproduction contains no video information.

7. The medium according to claim 6, wherein said search reproduction control information is located at a beginning portion of each of said plurality of multiplexed partial record information.

8. The medium according to claim 6, wherein each of said multiplexed partial record information includes at least one of video information containing still picture information which is a subject to still picture reproduction, sub-picture information to be superimposed on said video information, and audio information.

9. The medium according to claim 6, wherein said multiplexed partial record information corresponding to said reproduction time of said still picture information includes at least one of sub-picture information and audio information to be reproduced during said still picture reproduction.

10. The medium according to claim 6, wherein said multiplexed partial record information containing no video information consists of only said search reproduction control information.

11. An information reproducing apparatus for reproducing information recorded on an information recording medium comprising a plurality of processed partial record information pieces, each corresponding to a predetermined reproduction time interval, and search reproduction control information including time information indicating a reproduction time when each of the processed partial record information pieces is to be reproduced, and including search information indicating addresses of other processed partial record information pieces, wherein said processed partial record information pieces and said search reproduction control information are multiplexed in order to form a plurality of multiplexed partial record information, said apparatus comprising:

detection and demodulation means for detecting and demodulating information recorded on said information recording medium, thereby obtaining a demodulation signal;

extracting means for extracting said search reproduction control information from said demodulation signal; and control means for controlling reproduction of information based on said extracted search reproduction control information, wherein at least one of said multiplexed partial record information includes video information containing still picture information which is a subject to still picture reproduction, and wherein in a case when said reproduction time during which said still picture reproduction is to be performed is included in said predetermined reproduction time interval, said multiplexed partial record information corresponding to said reproduction time of said still picture reproduction contains no video information.

12. The apparatus according to claim 11, wherein said search reproduction control information is located at a beginning portion of each of said plurality of multiplexed partial record information.

13. The apparatus according to claim 11, wherein each of said multiplexed partial record information includes at least one of video information containing still picture information which is a subject to still picture reproduction, sub-picture information to be superimposed on said video information, and audio information.

14. The apparatus according to claim 11, wherein said multiplexed partial record information corresponding to said reproduction time of said still picture information includes at least one of sub-picture information and audio information to be reproduced during said still picture reproduction.

15. The apparatus according to claim 11, wherein said multiplexed partial record information containing no video information consists of only said search reproduction control information.

* * * * *